United States Patent [19]

Gabrielsen et al.

[11] 4,390,606

[45] Jun. 28, 1983

[54] COLOR-FORMING PARA-SULFONAMIDODIPHENYLAMINE DYE PRECURSOR AND SULFONIMIDE DYE IN PHOTOGRAPHIC MATERIAL AND PROCESS

[75] Inventors: Rolf S. Gabrielsen, Webster; Patricia A. Graham, Williamson; James E. Klijanowicz, Pittsford; Max H. Stern, Rochester, all of N.Y.

[73] Assignee: Eastman Kodak Company, Rochester, N.Y.

[21] Appl. No.: 394,349

[22] Filed: Jul. 1, 1982

Related U.S. Application Data

[63] Continuation-in-part of Ser. No. 280,626, Jul. 6, 1981, abandoned.

[51] Int. Cl.$^3$ .......................... G03C 7/00; G03C 1/40
[52] U.S. Cl. .......................................... 430/9; 430/17; 430/364; 430/375; 430/405; 430/409; 430/440; 430/448; 430/542; 430/955
[58] Field of Search ................... 430/9, 17, 364, 375, 430/542, 955, 405, 440, 448, 409

[56] References Cited

U.S. PATENT DOCUMENTS

| | | | |
|---|---|---|---|
| 2,266,456 | 12/1941 | Wilder | 95/6 |
| 3,284,499 | 11/1966 | Dunbar | 260/556 |
| 3,482,971 | 12/1969 | Bloom et al. | 96/3 |
| 3,620,730 | 11/1971 | Cook et al. | 96/3 |
| 3,622,603 | 11/1971 | Bloom et al. | 260/397.7 |
| 3,755,605 | 8/1973 | Moore et al. | 424/321 |
| 3,813,244 | 5/1974 | Villard | 96/3 |
| 3,938,995 | 2/1976 | Gompf et al. | 96/55 |
| 4,035,184 | 7/1977 | Faul et al. | 96/22 |
| 4,368,246 | 1/1983 | Gabrielsen et al. | 430/364 |

OTHER PUBLICATIONS

Res. Disclosure, Dec. 1978, Item No. 17643.

*Primary Examiner*—J. Travis Brown
*Attorney, Agent, or Firm*—Richard E. Knapp

[57] ABSTRACT

A color-forming para-sulfonamidodiphenylamine dye precursor in a photographic material and process enables formation of a sulfonimide dye image by means of cross-oxidation without the need for a coupling reaction. The color-forming para-sulfonamidodiphenylamine dye precursor is useful in a photographic silver halide material for producing (i) a dye image, or (ii) a dye image and silver image. The exposed photographic material is processed to produce (a) a positive dye image, (b) a negative dye and negative silver image, (c) a negative dye image or (d) a positive dye image and a positive silver image.

55 Claims, No Drawings

COLOR-FORMING PARA-SULFONAMIDODIPHENYLAMINE DYE PRECURSOR AND SULFONIMIDE DYE IN PHOTOGRAPHIC MATERIAL AND PROCESS

This is a continuation-in-part application of Ser. No. 280,626 and R. S. Gabrielsen, P. A. Graham, J. E. Klizanowicz and M. H. Stern, filed July 6, 1981, now abandoned, entitled "Color-Forming Para-Sulfonamidodiphenylamine Dye Precursor and Sulfonimide Dye In Photographic Material and Process".

FIELD OF THE INVENTION

This invention relates to a photographic material and process for producing images by means of photosensitive silver halide and a color-forming para-sulfonamidodiphenylamine dye precursor which forms a sulfonimide dye. One aspect of the invention relates to a photographic element for producing such images. Another aspect relates to a photographic composition comprising the dye precursor according to the invention. A further aspect relates to processes for producing images in an imagewise exposed photographic material comprising a color-forming para-sulfonamidodiphenylamine dye precursor which forms a sulfonimide dye.

DESCRIPTION OF THE STATE OF THE ART

Photographic materials for producing silver images and dye images are known. The dye image in such materials is generally produced by a coupling reaction in which a developing agent is oxidized upon development of photosensitive silver halide in the material, followed by reaction of the resulting oxidized form of the developing agent with a coupling agent to produce a dye image. It has been desirable to provide alternative means for producing a dye image, especially a dye image that enhances a silver image, other than by a coupling reaction. The formation of dye images according to the invention by means of a dye precursor does not involve a coupling reaction.

Production of reversal color images, also known as positive dye images, by developing a silver image in an imagewise exposed photographic material is also known. Such reversal color images and processes for producing such images are described in, for example, U.S. Pat. No. 4,035,184 and U.S. Pat. No. 3,938,995. These patents describe production of a negative dye image by means of a leuco dye comprising the reaction product of a color-forming coupler and an N,N-dialkyl-p-phenylenediamine. Neither of these patents relate to the formation of a dye image and silver image in which the dye is produced from a color-forming para-sulfonamidodiphenylamine dye precursor. The present invention also avoids the need for a coupling reaction to produce a dye described in these patents.

The term "photographic material" herein means photographic elements and photographic compositions. For instance, photographic material herein includes photographic elements and photographic compositions comprising photosensitive silver halide and a color-forming para-sulfonamidodiphenylamine dye precursor according to the invention.

SUMMARY OF THE INVENTION

It has been found according to the invention that a stable sulfonimide dye image, especially a sulfonimide dye image that enhances a silver image, is produced by means of a photographic material comprising, in reactive association, in binder: (a) photosensitive silver halide, and (b), a color-forming dye precursor which is imagewise converted upon exposure and processing of the photographic material to a sulfonimide dye by cross-oxidation, preferably by means of a cross-oxidizing silver halide developing agent. The color-forming dye precursor according to the invention is a color-forming para-sulfonamidodiphenylamine dye precursor which is free of sulfonamido groups in an ortho position in relation to the amine —NH— separating the two aryl rings and which forms a sulfonimide dye.

An especially useful color-forming sulfonamidodiphenylamine dye precursor according to the invention is one that comprises a stabilizer group. The stabilizer group provides increased light stability to the resulting dye upon processing of the photographic material containing the color-forming sulfonamidodiphenylamine dye precursor. The term stabilizer group herein means such a group that provides increased light stability to the resulting dye from the sulfonamidodiphenylamine upon processing of the photographic material. Many stabilizer groups are useful as a component of the sulfonamidodiphenylamine according to the invention. An especially useful stabilizer group is a 2,4,6-triisopropylbenzene stabilizing group bonded to a sulfonamido group of the para-sulfonamidodiphenylamine. A combination of stabilizer groups is also useful.

It has also been found that a positive sulfonimide dye image is provided in a photographic material according to the invention by a process comprising (a) developing the exposed photographic material is an alkaline photographic developer in the absence of a cross-oxidizing silver halide developing agent; then, (b) fogging the resulting element, such as by uniformly exposing the resulting element to a flash exposure of light or, alternatively, a chemical fogging agent; followed by (c) developing the photographic element in an alkaline cross-oxidizing developer, such as a 3-pyrazolidone cross-oxidizing developer; and, then (d) bleaching and fixing the photographic material in a silver halide bleaching and fixing composition to produce a positive dye image in the photographic material. After step (a) and before step (b), optionally the photographic process for producing a positive sulfonimide dye image includes a stop bath treatment. This enables a desirable lowering of the pH of the development to a point at which development of a negative silver image stops quickly. This produces an improved dye image upon processing.

A negative sulfonimide dye image and a negative silver image are produced in an imagewise exposed photographic material comprising, in reactive association, in binder, (a) photosensitive silver halide, and (b) a color-forming para-sulfonamidodiphenylamine dye precursor by developing the photographic material in an alkaline, cross-oxidizing, photographic silver halide developer composition, preferably such a composition comprising a 3-pyrazolidone silver halide developing agent. The negative sulfonimide dye image preferably enhances the negative silver image. This enables a lower concentration of silver in the photographic material before exposure than otherwise might be necessary to form a similar developed image from silver halide alone. When the negative, developed silver image is removed from the photographic material, such as by means of a bleaching and fixing composition, a negative sulfonimide dye image remains in the processed photographic material.

A positive sulfonimide dye image and a positive silver image are produced in an imagewise exposed photographic material according to the invention by means of direct-positive photographic silver halide. A process for producing a positive, sulfonimide dye image and a positive, silver image in an imagewise exposed photographic material comprising, in reactive association, in binder, (a) direct-positive photographic silver halide, and (b) a color-forming para-sulfonamidodiphenylamine dye precursor comprises (A) developing the photographic element by means of an alkaline, cross-oxidizing photographic silver halide developing composition; then (B) fixing the resulting photographic element to produce a positive sulfonimide dye image and a positive silver image.

In each of the photographic materials and processes, the resulting sulfonimide dye in the image areas has increased stability. The sulfonimide dyes according to the invention containing a stabilizer group exhibit better stability than dyes that do not contain a stabilizer group.

DETAILED DESCRIPTION OF THE INVENTION

Many para-sulfonamidodiphenylamines are useful color-forming sulfonamidodiphenylamine dye precursors in photographic materials and processes according to the invention. Combinations of color-forming para-sulfonamidodiphenylamine dye precursors are also useful, if desired. The color-forming para-sulfonamidodiphenylamine dye precursor is selected to provide a sulfonimide dye image by means of a cross-oxidizing photographic silver halide developing agent after imagewise exposure.

The term "para-sulfonamidodiphenylamine" herein alternatively means 4'-sulfonamidodiphenylamine.

One illustrative class of color-forming para-sulfonamidodiphenylamine dye precursors which form sulfonimide dyes is represented by the formula:

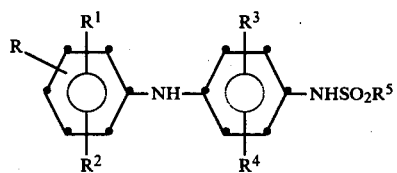

wherein:
R is in the meta or para position and is an electron donating substituent selected from amino groups represented by the formula:

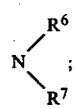

alkoxy containing 1 to 20 carbon atoms, such as methoxy, ethoxy, propoxy, hexyloxy and octadecyloxy; sulfonamido, such as $R^{5A}SO_2NH$; aryloxy containing 6 to 20 carbon atoms, such as phenoxy, 3,4,5-trimethylphenoxy, 2,4-di-t-amylphenoxy and halophenoxy; and carboxamido groups, such as acetamido, N-methylacetamido and propionamido;

$R^1$ is in the ortho or meta position and is hydrogen, alkyl containing 1 to 3 carbon atoms, such as methyl, ethyl and propyl, carbamoyl, alkoxy containing 1 to 3 carbon atoms, such as methoxy, ethoxy and propoxy, sulfonylalkyl containing 1 to 3 carbon atoms, siuch as sulfonylmethyl, sulfonylethyl, and sulfonylpropyl, sulfonylaryl containing 6 to 12 carbon atoms, such as sulfonylphenyl and sulfonyl methylphenyl, chlorine, bromine, iodine or fluorine;

$R^2$ is hydrogen, alkyl containing 1 to 3 carbon atoms, such as methyl, ethyl and propyl, carbamoyl, alkoxy containing 1 to 20 carbon atoms, such as methoxy, ethoxy and propoxy, sulfonylalkyl containing 1 to 5 carbon atoms, such as sulfonylmethyl, sulfonylethyl, and sulfonylpropyl, sulfonylaryl containing 6 to 12 carbon atoms, such as sulfonylphenyl and sulfonyl methylphenyl, chlorine, bromine, iodine or fluorine;

$R^3$ is hydrogen, alkyl containing 1 to 20 carbon atoms, such as methyl, ethyl and propyl, haloalkyl containing 1 to 3 carbon atoms, such as tribromomethyl, trifluoromethyl, 2,2,2-trichloroethyl, and 3,3,3-trichloropropyl, alkoxy containing 1 to 20 carbon atoms, such as methoxy, ethoxy, propoxy and decyloxy, an ester containing 1 to 20 carbon atoms, such as formoxy, acetoxy, butyroxy and stearoxy, carboxy, carboxamido, such as acetamido, N-methylacetamido and propionamido, chlorine, bromine, iodine, fluorine, carbamoyl, sulfonic acid, sulfamyl, sulfonylalkyl containing 1 to 5 carbon atoms, such as sulfonylmethyl, sulfonylethyl and sulfonylpropyl, ureido, or a carbocyclic group containing 5 to 12 carbon atoms, such as cyclohexyl, cyclopentyl and dimethylcyclohexyl;

$R^4$ is hydrogen, alkyl containing 1 to 20 carbon atoms, alkoxy containing 1 to 20 carbon atoms, such as methoxy, ethoxy and propoxy, an ester represented by the formula:

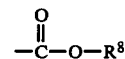

carboxy, carboxamido, chlorine, bromine, iodine, fluorine, carbamoyl, sulfonic acid, sulfamyl, sulfonylalkyl containing 1 to 3 carbon atoms, such as sulfonylmethyl, sulfonylethyl and sulfonylpropyl, ureido and a carbocyclic group containing 5 to 12 carbon atoms, such as cyclopentyl, cyclohexyl and dimethylcyclohexyl; or atoms necessary to complete a naphthyl ring with the adjoining phenyl ring containing $NHSO_2R^5$;

$R^5$ and $R^{5A}$ are individually alkyl containing 1 to 20 carbon atoms, such as methyl, ethyl, propyl, decyl, eicosyl and benzyl, aryl containing 6 to 20 carbon atoms, such as phenyl, naphthyl, halophenyl, 2,4,6-triisopropylphenyl, 2,6-di-methylphenyl, p-tolyl, 2,4,6-trimethylphenyl and 2,6-diisopropylphenyl;

$R^6$ is hydrogen, alkyl containing 1 to 20 carbon atoms, such as methyl, ethyl, propyl, hexyl, decyl, and eicosyl,

or aryl containing 6 to 20 carbon atoms, such as phenyl, tolyl and trimethylphenyl, or represents, with $R^7$, atoms such as carbon, oxygen, sulfur and nitrogen atoms completing a heterocyclic group, including a 5- or 6-member heterocyclic group, such as a pyridino, morpholino or piperidino group;

$R^7$ is alkyl containing 1 to 20 carbon atoms, such as methyl, ethyl, propyl and decyl, carbamoyl, carboxamido, or represents, with $R^6$, atoms such as carbon, oxygen, sulfur and nitrogen atoms completing a heterocyclic group, including a 5- or 6-member heterocyclic group;

$R^8$ is alkyl, containing 1 to 4 carbon atoms, such as methyl, ethyl, propyl and butyl; and $R^{6A}$ is alkyl containing 1 to 20 carbon atoms, such as ethyl, octyl and decyl.

The terms "alkyl" and "aryl" herein means unsubstituted alkyl and unsubstituted aryl. The terms "alkyl" and "aryl" herein also mean substituted alkyl and substituted aryl wherein the alkyl and aryl are substituted by groups which do not adversely affect the sulfonamidodiphenylamines or the corresponding sulfonimide dyes according to the invention. Examples of suitable substituted alkyl groups include alkyl containing a sulfonamido group, such as $CH_3SO_2NHCH_2CH_2$—, a carboxamido group, an alkoxy group, such as methoxy or ethoxy, a carboxyl (—COOH), an aryl group, such as a benzyl group, and carbonyl. An alkyl group containing an aryl substituent is also known as an aralkyl group. Examples of suitable substituted aryl groups include phenyl containing an alkoxy group, such as methoxy and ethoxy, carboxyl, alkyl such as methyl, ethyl, propyl and butyl, and hydroxy. An especially useful substituted aryl group is an alkyl substituted aryl group, such as tolyl, 2,4,6-triisopropylphenyl and t-butylphenyl. An alkyl substituted aryl group is also known as an alkaryl group.

Especially useful para-sulfonamidodiphenylamines and corresponding sulfonimide dyes in imaging materials and processes are those which comprise a stabilizer group. The term stabilizer group herein means a group that is substituted on the sulfonamidodiphenylamine to provide increased stability to the sulfonamidodiphenylamine and the corresponding sulfonimide dye. A particularly useful stabilizer group is a 2,4,6-triisopropylphenyl group represented by the formula:

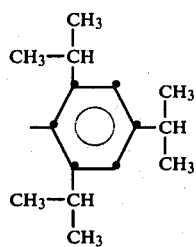

This group is alternatively hereiin represented by the formula:

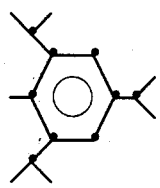

The group triisopropylphenyl herein is synonomous with a triisopropylbenzene group. While a 2,4,6-triisopropylphenyl group is a particularly useful stabilizer group, other stabilizer groups are also useful.

Examples of useful color-forming para-sulfonamidodiphenylamine dye precursors according to the invention include:

4-N,N-Dihexylamino-4'-(2,4,6-triisopropylbenzenesulfonamido)diphenylamine represented by the formula:

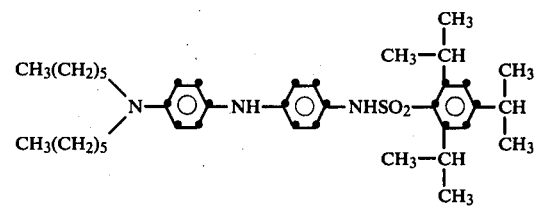

4-n-Hexyloxy-3'-methyl-4'-(2,4,6-triisopropylbenzenesulfonamido)diphenylamine represented by the formula:

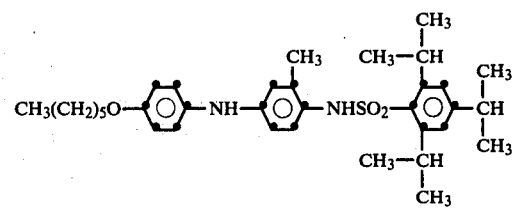

4-N,N-diethylamino-4'-(2,4,6-triisopropylbenzenesulfonamido)diphenylamine represented by the formula:

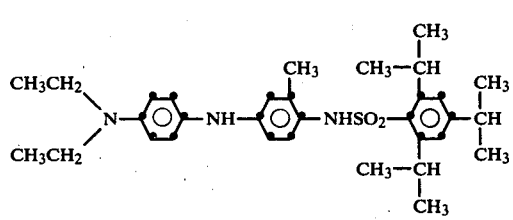

4-N,N-dihexylamino-2'-methylsulfonyl-4'-(2,4,6-triisopropylbenzenesulfonamido)diphenylamine represented by the formula:

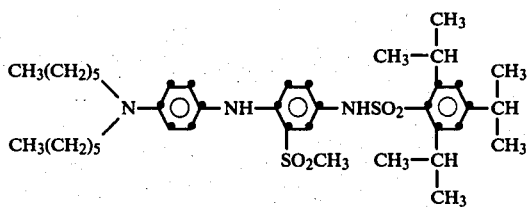

An especially useful embodiment is a photographic element comprising a support having thereon, in reactive association, in a gelatino binder: (a) photosensitive silver halide gelatino emulsion; and (b) a color-forming dye precursor which is imagewise converted upon exposure and processing of the element to a dye by cross-oxidation by means of a cross-oxidizing developing agent wherein the color-forming dye precursor is a para-sulfonamidodiphenylamine consisting essentially of 4-N,N-dihexylamino-4'-(2,4,6-triisopropylbenzenesulfonamido)diphenylamine.

Another illustrative class of color-forming para-sulfonamidodiphenylamine dye precursors that are useful in a photographic material is the class of color-forming para-sulfonamidodiphenylamines represented by the formula:

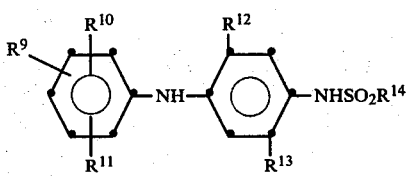

wherein:

$R^9$ is in the meta or para position and is an electron donating substituent selected from

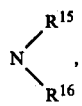

alkoxy containing 1 to 20 carbon atoms, such as methoxy, ethoxy, propoxy and hexyloxy, aryloxy containing 6 to 12 carbon atoms, such as phenoxy and naphthoxy, sulfonamido, and carboxamido groups such as acetamido, butyramido, N-methylacetamido and n-octylureido;

$R^{10}$ is in the ortho or meta position and is hydrogen, alkyl containing 1 to 3 carbon atoms, such as methyl, ethyl and propyl, carbamoyl, alkoxy containing 1 to 3 carbon atoms, such as methoxy, ethoxy and propoxy, sulfonylalkyl containing 1 to 3 carbon atoms, such as sulfonylmethyl, sulfonylethyl and sulfonylpropyl, sulfonylaryl containing 6 to 12 carbon atoms, such as sulfonylphenyl and sulfonylmethylphenyl, chlorine, bromine, iodine or fluorine, or in the meta position is sulfonamido;

$R^{11}$ is hydrogen, alkyl containing 1 to 3 carbon atoms, such as methyl, ethyl and propyl, carbamoyl, alkoxy containing 1 to 3 carbon atoms, such as methoxy, ethoxy and propoxy, sulfonylalkyl containing 1 to 3 carbon atoms, such as sulfonylmethyl, sulfonylethyl and sulfonylpropyl, sulfonylaryl containing 6 to 12 carbon atoms, such as sulfonylphenyl and sulfonylmethylphenyl, chlorine, bromine, iodine or fluorine;

$R^{12}$ is hydrogen, alkoxy containing 1 to 20 carbon atoms, or carboxamido, such as acetamido, propionamido, pivalamido and ureido;

$R^{13}$ is hydrogen, alkoxy containing 1 to 20 carbon atoms, or carboxamido, such as acetamido, propionamido, pivalamido and ureido;

$R^{14}$ is alkyl containing 1 to 20 carbon atoms, such as methyl, ethyl, propyl, decyl and eicosyl, aryl containing 6 to 20 carbon atoms, such as phenyl tolyl, 2,4,6-triisopropylphenyl and 2,4,6-trimethylphenyl;

$R^{15}$ is hydrogen or alkyl containing 1 to 20 carbon atoms, such as methyl, ethyl, propyl, decyl and eicosyl; and, $R^{16}$ is hydrogen, alkyl containing 1 to 20 carbon atoms, such as methyl, ethyl, propyl, decyl and eicosyl, or aryl containing 6 to 12 carbon atoms, such as phenyl and tolyl.

Particularly useful compounds are those within the above formula wherein when $R^{13}$ is carboxamido, then $R^{12}$ is carboxamido.

The term "sulfonamido" herein means a substituent group represented by the formula:

$$-NHSO_2R^{17}$$

wherein $R^{17}$ is a substituent which does not adversely affect the diphenylamine compound or imide dye according to the invention. $R^{17}$ is, for example, alkyl containing 1 to 20 carbon atoms, such as methyl, ethyl, propyl, butyl, decyl, and eicosyl, or aryl containing 6 to 20 carbon atoms, such as phenyl, tolyl and 2,4,6-triisopropylphenyl. Examples of such groups include 2,4,6-triisopropylsulfonamido, methylsulfonamido and tolylsulfonamido. The term methylsulfonamido herein is synonomous with methanesulfonamido.

Examples of useful color-forming para-sulfonamidodiphenylamine dye precursors within the above formula containing carboxamido groups include:

4-[N-ethyl-N-(β-methanesulfonamidoethyl)amino]-2-methyl-2',5'-dipivalamido-4'-(2,4,6-triisopropylbenzenesulfonamido)diphenylamine represented by the formula:

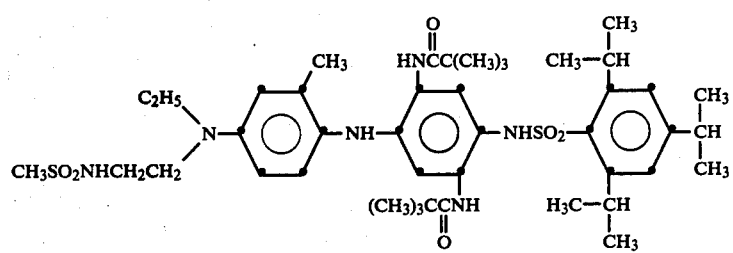

4-n-Hexyloxy-2',5'-dipivalamido-4'-(2,4,6-triisopropylbenzenesulfonamido)diphenylamine represented by the formula:

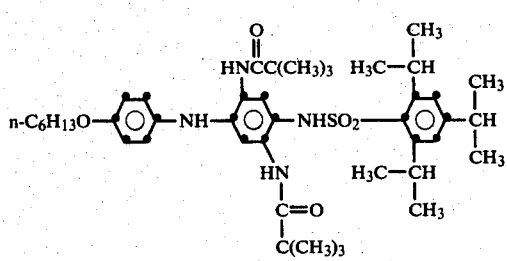

A further illustrative class of color-forming para-sulfonamidodiphenylamine dye precursors is represented by the formula:

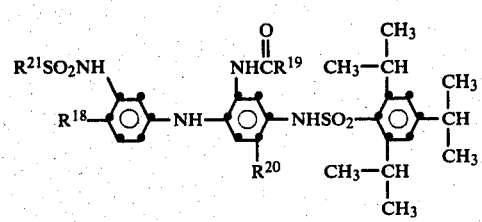

wherein:

$R^{18}$ is alkyl containing 1 to 20 carbon atoms, such as methyl, ethyl, propyl, decyl and eicosyl, alkoxy containing 1 to 20 carbon atoms, such as methoxy, ethoxy and dodecyloxy, or an appropriate amino group, such as

$R^{19}$ is alkyl containing 1 to 20 carbon atoms, such as methyl, ethyl, propyl, decyl and eicosyl, aryl containing 6 to 12 carbon atoms, such as phenyl and tolyl, alkoxy containing 1 to 4 carbon atoms, such as methoxy, ethoxy, and butoxy, aryloxy containing 6 to 12 carbon atoms, such as phenoxy and 3,4,5-trimethylphenoxy, or NH-$R^{24}$;

$R^{20}$ is hydrogen or

$R^{21}$ is alkyl containing 1 to 12 carbon atoms, such as methyl, ethyl, propyl and dodecyl;

$R^{22}$ is hydrogen or alkyl containing 1 to 20 carbon atoms, such as methyl, ethyl, propyl and decyl;

$R^{23}$ is hydrogen, alkyl containing 1 to 20 carbon atoms, such as methyl, ethyl, propyl and hexyl, or aryl containing 6 to 12 carbon atoms, such as phenyl and tolyl;

$R^{24}$ is alkyl containing 1 to 20 carbon atoms, such as methyl, ethyl and decyl, aryl containing 6 to 12 carbon atoms, such as phenyl and tolyl, alkoxy containing 1 to 4 carbon atoms, such as methoxy, ethoxy and butoxy, or aryloxy containing 6 to 12 carbon atoms, such as phenoxy and 3,4,5-trimethylphenoxy;

$R^{25}$ is alkyl containing 1 to 20 carbon atoms, such as methyl, ethyl, propyl and decyl, aryl containing 6 to 12 carbon atoms, such as phenyl and tolyl, alkoxy containing 1 to 4 carbon atoms, such as methoxy and butoxy, or aryloxy containing 6 to 12 carbon atoms, such as phenoxy and 3,4,5-trimethylphenoxy.

Examples of suitable color-forming para-sulfonamidodiphenylamine dye precursors within this formula include:

3-Methanesulfonamido-4-methyl-2'-palmitamido-4'-(2,4,6-triisopropylbenzenesulfonamido)diphenylamine represented by the formula:

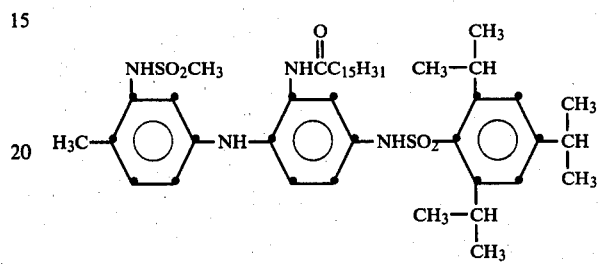

3-Methanesulfonamido-4-methoxy-2'-pivalamido-4'-(2,4,6-triisopropylbenzenesulfonamido)diphenylamine represented by the formula:

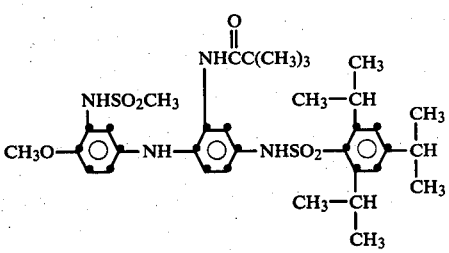

The color-forming para-sulfonamidodiphenylamine dye precursors are prepared generally by one of four methods. The first method (Method 1) involves condensation of a phenylenediamine compound or ether-substituted aniline with a substituted halonitrobenzene wherein the nitro group is ortho or para with respect to a halogen atom on the benzene ring, followed by reduction of the nitro group and subsequent sulfonylation of the intermediate amine.

The second method (Method 2) involves condensation of a halonitroaniline with sulfonyl chloride, followed by condensation with a phenylenediamine or aniline. The resulting intermediate is then reduced, followed by acylation of the intermediate amine to yield a carboxamido-substituted sulfonamidodiphenylamine. The sulfonylation step is avoidable by using a halonitrosulfonamidobenzene that condenses directly with the phenylenediamine or aniline.

The third method of preparation (Method 3) involves condensation of a substituted aniline with a sulfonyl chloride, followed by oxidative coupling. This oxidative coupling is with a phenylenediamine in the presence of ferricyanide and base to yield a dye that is subsequently reduced, such as by hydrogenation in the presence of a suitable palladium-charcoal catalyst, to form the corresponding leuco form of the compound. Carboxamido groups are introduced prior to oxidative coupling.

The fourth method of preparation (Method 4) involves a Smiles rearrangement method for those cases in which the direct nucleophilic condensation, such as in Method 1, is not entirely satisfactory.

An illustrative preparation for preparing a compound by Method 1 is the preparation of 4-N,N-dihexylamino-4'-benzenesulfonamidodiphenylamine. This illustrative preparation is as follows.

A sample of N,N-dihexyl-p-phenylenediamine-di-p-toluenesulfonic acid salt (30.8 grams, 0.05 mole) in dimethylformamide (150 ml) is stirred under nitrogen atmosphere as successive additions of sodium bicarbonate (16.8 grams) and para-fluoronitrobenzene (7.05 grams, 0.05 mole) are made. After stirring overnight at 90° to 100° C., the reaction mixture is poured into ice water and extracted with ethyl acetate. The extract is washed with water, dried and freed of solvent. The filtrate residue is then chromatographed from an appropriate silica gel, using benzene as eluent, to provide 4-dihexylamino-4'-nitrodiphenylamine that is characterized by nuclear magnetic resonance. This nitro intermediate is reduced to the corresponding amine by hydrogenation over palladium-charcoal catalyst in a suitable hydrogenation apparatus. The corresponding amine is converted to its benzenesulfonamide derivative by means of benzenesulfonyl chloride. The resulting color-forming sulfonamidodiphenylamine dye precursor is purified by methods known in the organic synthesis art, such as by recrystallization from an appropriate solvent, such as methanol.

Another illustrative preparation is the preparation of 4-N,N-diethylamino-4'-benzenesulfonamidodiphenylamine according to Method 1. This method is as follows.

A solution of N,N-dimethyl-p-phenylenediamine (16.4 grams, 0.18 mole) and p-fluoronitrobenzene (14.1 grams, 0.10 mole) in 200 ml of dimethylformamide is stirred overnight with sodium bicarbonate (16.8 grams, 0.20 mole) at 85° to 90° C. under a nitrogen atmosphere. This reaction mixture is poured into ice water and extracted with ethyl acetate. Evaporation of the solvent provides 4-diethylamino-4'-nitrodiphenylamine which is recrystallized from ethanol to provide red violet leaflets having a melting point of 139° to 141° C. This nitro intermediate (5.7 grams) in tetrahydrofuran (100 ml) is hydrogenated over a palladium-charcoal catalyst (1.2 grams) in a suitable hydrogenation apparatus (40 psi hydrogen pressure). The corresponding amine is converted to the desired benzenesulfonamide compound by means of reaction with benzenesulfonyl chloride. The product is recrystallized from methanol to provide a gray solid having a melting point of 145° to 146° C.

A further preparation that illustrates the Method 1 is the preparation of 4-methoxy-4'-benzenesulfonamidodiphenylamine. This preparation is as follows.

A solution of p-anisidine (49.2 grams, 0.4 mole) and p-fluoronitrobenzene (28.2 grams, 0.2 mole) in dimethylsulfoxide was stirred for 24 hours on a steam bath. The resulting red reaction mixture was poured into water (500 ml) and extracted with ethyl acetate. The extract was washed with water, dried over magnesium sulfate and evaporated to dryness. The residue was slurried in ligroin and filtered to provide a brick red solid. This was dissolved in ethyl acetate, warmed with charcoal, and the filtrate filtered. The filtrate was evaporated and the residue recrystallized from ethyl acetate to provide 4-methoxy-4'-nitrodiphenylamine having a melting point of 149° to 151° C. A solution of the resulting nitro compound (24.4 grams, 0.1 mole) in ethyl acetate (250 ml) is converted to the corresponding amine by hydrogenation over a palladium-charcoal catalyst at 60 psi hydrogen pressure. After filtration, the solvent is removed under vacuum and the light purple solid dissolved in pyridine (150 ml). This is reacted with benzenesulfonyl chloride (17.7 grams, 0.1 mole) by stirring for 3 hours under a nitrogen atmosphere at 25° C. After dilution with water (500 ml), the organic phase is washed with water, dried over magnesium sulfate and freed of solvent. The red oil resulting is dissolved in chloroform and filtered through an appropriate filtering composition. The filtrate residue is purified, such as by recrystallization three times from chloroform-ligroin, to provide a desired white powder having a melting point of 133° to 135° C.

A further example of a method of preparing a compound according to Method 1 is the preparation of 4-N,N-dihexylamino-4'-(2,4,6-triisopropylbenzenesulfonamido)diphenylamine. This method is carried out as follows.

A sample (5.24 grams, 0.013 mole) of the compound 4-N,N-dihexylamino-4'-nitrodiphenylamine is reduced by hydrogenation in a suitable hydrogenation apparatus in dry tetrahydrofuran (100 ml) containing palladium-charcoal catalyst (1.2 grams). The resulting filtrate is freed of solvent under vacuum, and the resulting 4'-amino derivative dissolved in dry pyridine (25 ml) and reacted at 5° C. with 2,4,6-triisopropylbenzenesulfonyl chloride (4.5 grams, 0.015 mole). After stirring for three hours at 25° C., the reaction mixture is poured into chloroform (200 ml) and ice water. The organic phase is washed five times with water, dried, concentrated to about 50 ml volume and chromatographed on an appropriate silica gel. The chloroform eluate is freed of solvent, and the filtrate residue recrystallized from methanol. The crystalline product is purified by washing with an appropriate solvent, such as a methanol-water mixture, and dried to provide the desired product having a melting point of 127° to 129° C.

An illustrative preparation according to Method 2 is the preparation of 4-[N-ethyl-N-(β-methanesulfonamidoethyl)amino]-2-methyl-2'-octanamido-4'-(2,4,6-triisopropylbenzenesulfonamido)diphenylamine. This preparation is as follows.

The following preparation of a desired intermediate is carried out:

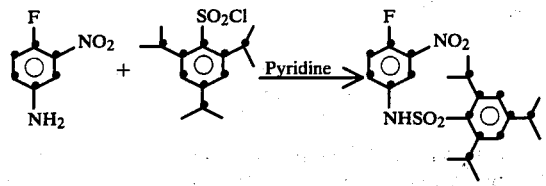

A solution of 4-fluoro-3-nitroaniline (15.6 grams, 0.1 mole) in pyridine (400 ml) is stirred at room temperature and 2,4,6-triisopropylbenzenesulfonyl chloride (30.2 grams, 0.1 mole) is added in bulk. The resulting solution is stoppered tightly and stirred at room temperature (about 20° C.) overnight (about 18 hours). The reaction mixture is then poured over an ice hydrochloric acid (aqueous) mixture (500 grams of ice and 500 ml of concentrated aqueous hydrogen chloride). An oily solid separates and is removed by filtration. Repeated recrystallization from methanol and water provides light golden crystals having a melting point of 151° to 152° C.

The desired intermediate product is identified by methods known in the chemical analytical art, such as by elemental analysis.

The following reaction is then carried out:

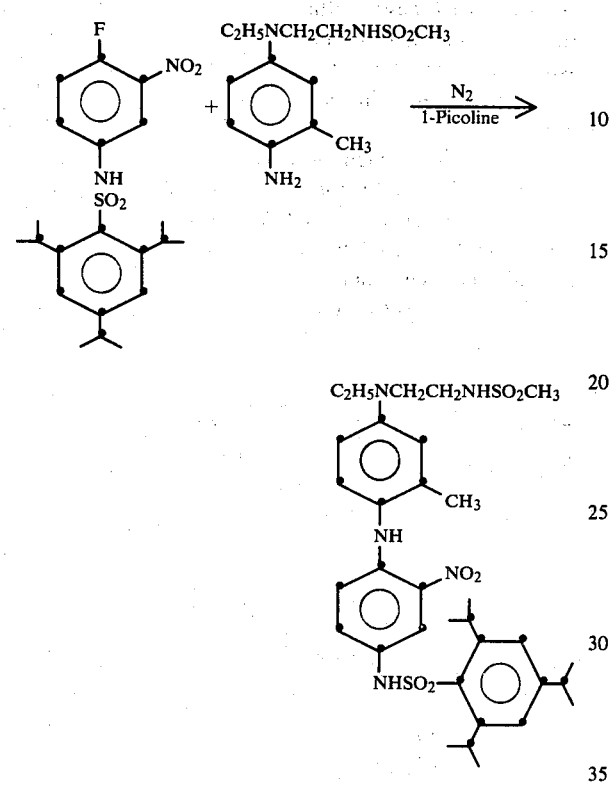

This reaction is carried out as follows.

42.2 grams (0.1 mole) of 2-fluoro-5-(2,4,6-triisopropylbenzenesulfonamido)nitrobenzene in 275 ml of 1-picoline is stirred at reflux under nitrogen for three days with 40.6 grams (0.15 mole) of 4-amino-3-methyl-N-ethyl-N-(β-methanesulfonamidoethyl) aniline (in the form of a free base). The reaction solution is allowed to cool to room temperature and is poured over an ice water mixture (1.5 liters). The mixture is allowed to stand until a red-brown oil separates. The aqueous layer is decanted from the oil. The oil is dissolved in $CH_2Cl_2$ (about 400 ml). The methylene chloride solution is then washed with vigorous agitation with 5 percent hydrochloric acid (50 ml concentrated HCl plus 380.5 ml of water) four times (500 ml), then with 5 percent $NaHCO_3$ (four times, 500 ml) and finally with 500 ml of water (four times). The methylene chloride layer is dried by means of sodium sulfate and then swirled with a filtering composition (Florisil) to remove a purple residue. Evaporation of the solvent provides a red oil which is taken up in about 150 ml of boiling methanol. The methanol solution is allowed to cool to room temperature (about 20° C.) overnight. A yellow-orange crystalline product having a melting point of 164° to 166° C. is produced. Thin layer chromatography on silica gel-glass and recrystallization from ethyl acetate provides the desired pure product which is identified by methods known in the chemical analytical art, such as by elemental analysis.

The following reaction is then carried out:

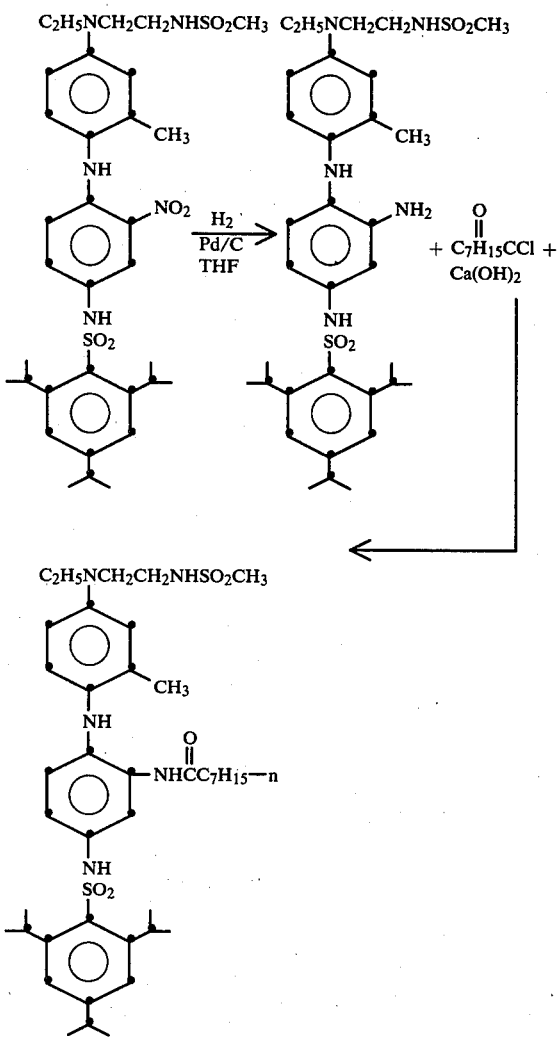

6.7 grams (0.01 mole) of the nitro compound in about 75 ml of tetrahydrofuran is reduced over 10 percent palladium on charcoal at 40 pounds psi in a hydrogen atmosphere until the hydrogen uptake ceases (within about 2.5 hours). The reaction mixture is blanketed with nitrogen and removed from the hydrogen atmosphere. No attempt is made to remove the catalyst at this point. The calcium hydroxide (0.41 grams, 0.055 mole), used as an HCl scavenger, is added in bulk to the reaction mixture. Next, octanoyl chloride (1.8 grams, 0.011 mole) is added in bulk to the reduction mixture. The resulting reaction mixture is stoppered tightly and allowed to be stirred at room temperature (about 21° C.) for three hours. No exothermic properties are observed. The catalyst and calcium salts are removed by filtration. The solvent is evaporated to yield a brown oil. The oil is taken up in boiling ether. The oil is dissolved and a precipitate begins to form. Filtering provides a colorless solid with a strong octanoyl chloride odor. The solid is re-suspended in boiling ether (100 ml), then filtered and vacuum dried at room temperature (about 21° C.) to yield 6.0 grams of a very faintly yellow-tinted solid having a melting point of 98° to 100° C. Thin layer chromatography with silica gel on glass shows one component with a variety of solvents (ethyl acetate, methylene chloride, acetone and acetonitrile). The compound is further characterized by methods known in the chemical analytical art, such as infrared analysis, nuclear magnetic resonance, mass spectrography and elemental analysis. Oxidation with aqueous potassium ferricyanide yields a green dye.

Another illustrative preparation according to Method 2 is the preparation of 3-methanesulfonamido-2'-octanamido-4'-(2,4,6-triisopropylbenzenesulfonamido)diphenylamine. This preparation is carried out as follows:

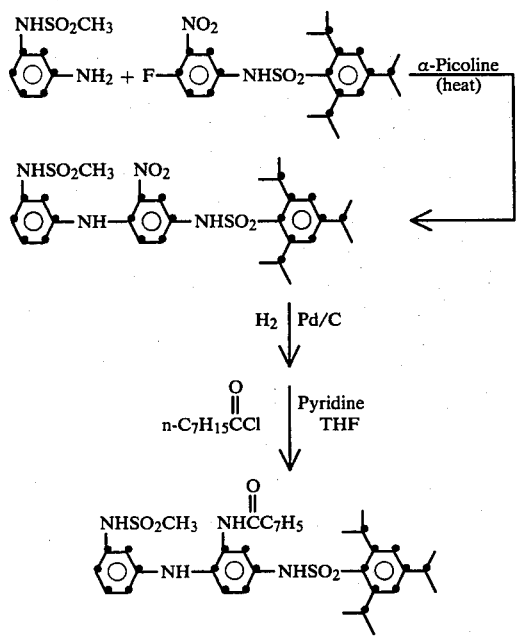

A mixture of meta-methanesulfonamidoaniline (1.86 grams, 0.01 mole) and 2-fluoro-5-(2,4,6-triisopropylbenzenesulfonamido)nitrobenzene (4.29 grams, 0.01 mole) in 25 ml of α-picoline is refluxed for 29 hours. This mixture is poured into a mixture of 100 grams of ice and 100 ml of 1 N hydrochloric acid, and the separated oil extracted with 100 ml of ethyl acetate. The extract is washed with water, dried by means of anhydrous sodium sulfate, and freed of solvent. The resulting oil is chromatographed on Woelm's silica gel using methylene chloride as the eluent. The column held material is eluted with 1:1 parts by volume methylene chloride/ethyl acetate, freed of solvent, and characterized as 3-methanesulfonamido-2'-nitro-4'-(2,4,6-triisopropylbenzenesulfonamido)diphenylamine. This compound is identified by, for example, nuclear magnetic resonance. 2.9 grams of the oily product is dissolved in 150 ml of 1:1 methanol/tetrahydrofuran and reduced by hydrogen over a palladium-charcoal catalyst. After removal of catalyst and solvent, the solid product is characterized, such as by nuclear magnetic resonance, as 3-methanesulfonamido-2'-amino-4'-(2,4,6-triisopropylbenzenesulfonamido)diphenylamine. 1.5 grams (0.003 mole) of this compound are then dissolved in 20 ml of dry pyridine and reacted at 5° C. with 6.5 grams of octanoyl chloride in 20 ml of dry tetrahydrofuran. After 18 hours at 25° C., the reaction mixture is poured into ice and 20 ml of concentrated hydrochloric acid, and the separated oil extracted with methylene chloride. The extract is washed with 10 percent sodium bicarbonate in water, dried, and freed of solvent. The resulting oil is purified by high pressure liquid chromatography to yield 1.3 grams of a glass that is recrystallized from ether and hexane to give white leaflets. The desired product is characterized, such as by nuclear magnetic resonance, and has a melting point of 146° to 148° C. A sample of this compound is oxidized in butyl acetate with potassium ferricyanide in pH 10 buffer, yielding a yellow dye possessing a maximum absorption of 429 nm.

A preparation which illustrates preparation of a compound by Method 3 is the preparation of 4-[N-ethyl-N-(β-methanesulfonamidoethyl)amino]-2-methyl-2',5'-dipivalamido-4'-(2,4,6-triisopropyl-benzenesulfonamido)diphenylamine. This preparation according to Method 3 is as follows:

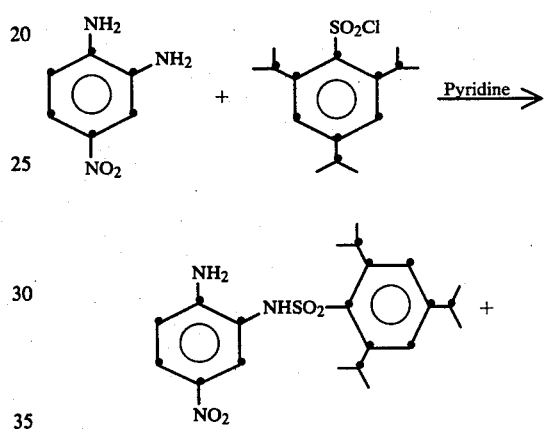

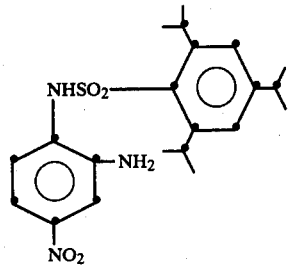

15.3 grams (0.1 mole) of the 4-nitro-o-phenylenediamine are dissolved in 200 ml of pyridine and the solution cooled in an ice bath. After one hour, a solution of 31.2 grams (0.1 mole) of 2,4,6-triisopropylbenzenesulfonyl chloride in 100 ml of tetrahydrofuran are added to the amine solution. The resulting mixture is stirred overnight at room temperature and is next poured over ice (400 grams) plus 300 ml of glacial acetic acid. An oil separates and solidifies upon standing. The crude solid is removed by filtration. The resulting solid is recrystallized twice from methanol-water to yield a yellow crystalline solid (27.6 grams) having a melting point of 187° to 191° C. Thin layer chromatography on silica gel (hexane:ethyl acetate; 3:2 by volume) indicates a major and minor component mixture, as indicated by the structures above. The desired intermediate is identified by elemental analysis.

The following reaction is then carried out:

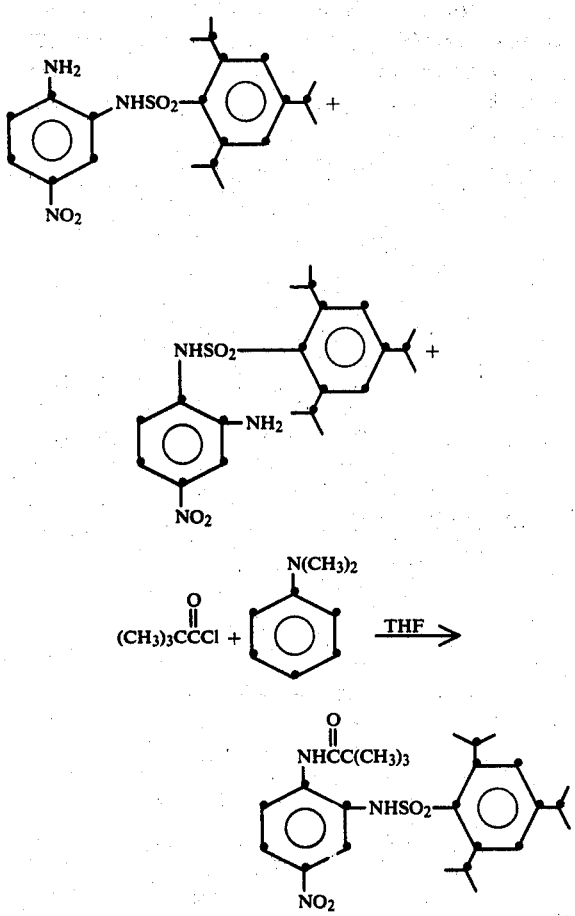

21.0 grams (0.05 mole) of the crude amine mixture are dissolved in 250 ml of tetrahydrofuran and 6.6 grams (0.05 mole) of the acid scavenger, N,N-dimethylaniline, are added in bulk. To this solution is added, dropwise in 15 minutes, 6.6 grams (0.05 mole) of the pivaloyl chloride. After stirring at room temperature overnight (at about 20° C.), thin layer chromatography indicates an incomplete reaction. Thus, an additional 5 millimoles of acid chloride and base are added, and the mixture is stirred overnight again. The mixture is diluted with methanol (100 ml), then quenched in one liter of water. An oil separates and solidifies. The solid obtained is recrystallized from methanol-water to provide 24.6 grams of solid having a melting point of 160° to 162° C. This material contains a small amount (less than 2 percent) of the following isomeric compound:

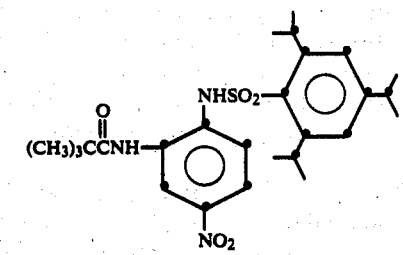

The desired product is identified by elemental analysis.

The following reaction is then carried out:

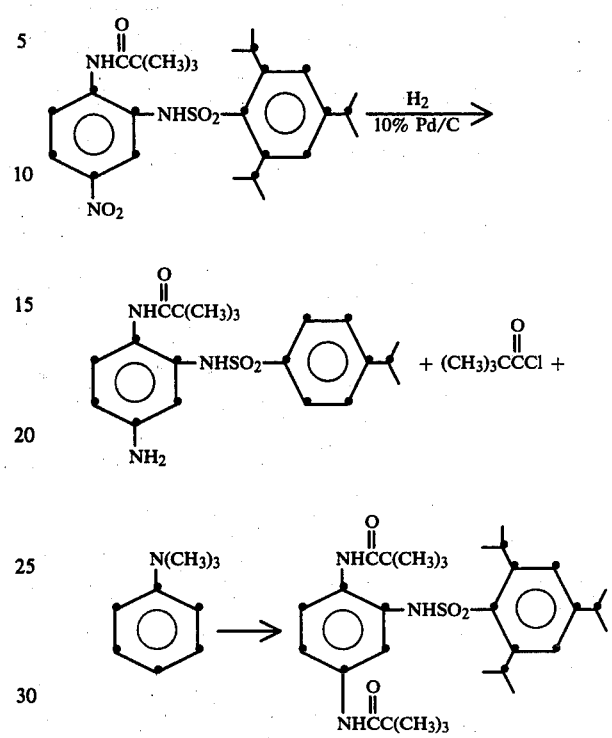

10.1 grams (0.02 mole) of the nitro compound is reduced at room temperature in 125 ml of tetrahydrofuran over 10 percent palladium on charcoal at 40 psi hydrogen pressure until hydrogen uptake ceases (1.5 hours). The catalyst is then removed by filtration. 2.5 grams (0.021 mole) of the acid scavenger, N,N-dimethylaniline, is added in bulk; followed by bulk addition of 2.5 grams (0.021 mole) of pivaloyl chloride. The mixture is stoppered and stirred overnight at room temperature. Solvent is then evaporated to yield an amber oil. The oil is crystallized from ethanol-water to yield 10.2 grams of colorless solid having a melting point of 196° C. This desired intermediate is identified, such as by elemental analysis.

The structure of the intermediate is confirmed by making the same compound by an alternate synthetic route:

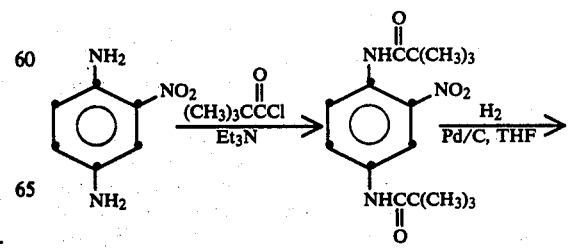

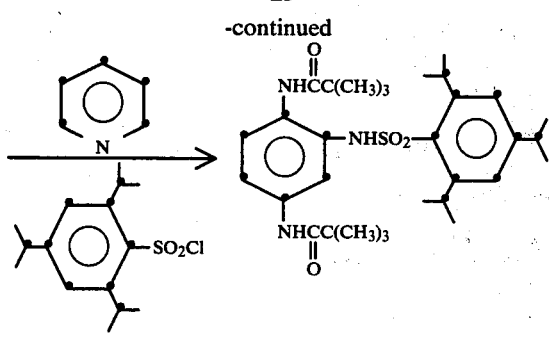

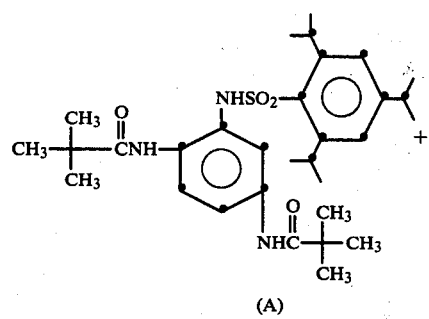

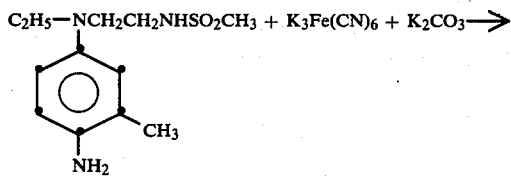

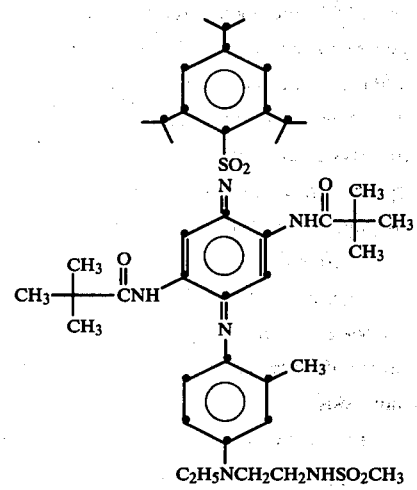

10.5 grams (0.02 mole) of the coupler (A) and 5.4 grams (0.02 mole) of the reducing agent (B) are dissolved in 200 ml of tetrahydrofuran. With rapid stirring, the aqueous potassium carbonate solution (11.0 grams, 0.08 mole in 50 ml of water) is added to the tetrahydrofuran solution of (A) and (B). Finally, the aqueous potassium ferricyanide solution (26.3 grams, 0.08 mole in 150 ml of water) is added dropwise to the above solution. A green dye began to form during the addition. Following the addition, the reaction mixture is stirred for 45 minutes and then is quenched in one liter of water. The dye is extracted into methylene chloride, washed well with water, and dried by means of sodium sulfate. It is then evaporated to yield a green oil. The oil is chromatographed in Woelm's silica gel with an ethyl acetate-hexane (8:2 parts by volume) eluent to yield 12.0 grams of green dye as a green glass (maximum absorption in butyl acetate of 672 nm). The glass is used directly without further purification.

The following reaction is carried out:

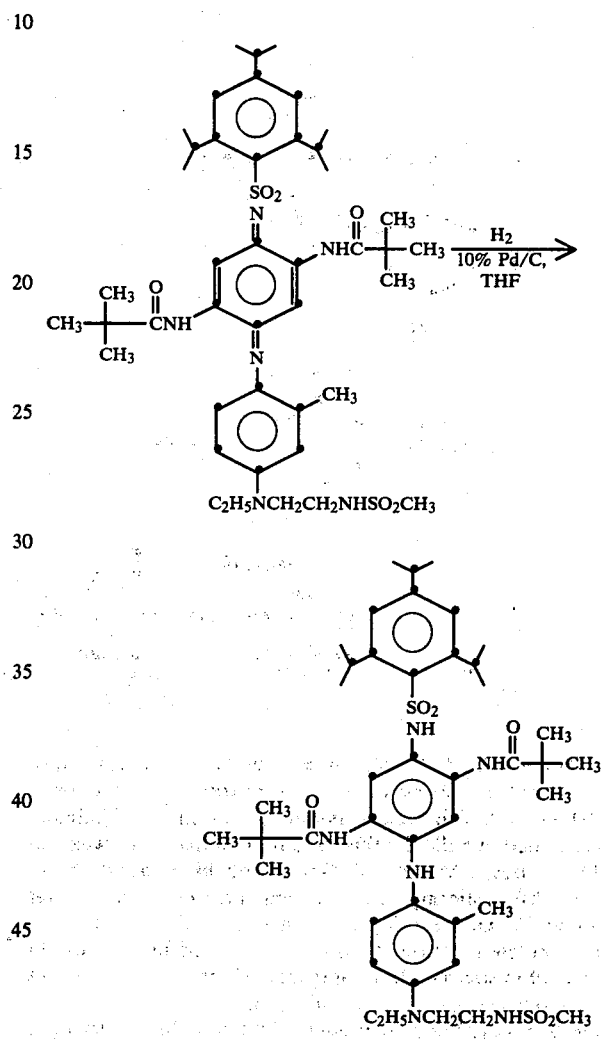

The glass obtained above is dissolved in tetrahydrofuran and reduced over 10 percent palladium on charcoal at room temperature (about 20° C.) and 40 psi hydrogen pressure until hydrogen uptake ceases (about 5 minutes). The catalyst is removed by filtration and the solvent is evaporated at reduced pressure to yield a light blue oil. The oil is recrystallized from ether-hexane (2:5:1 parts by volume) to yield 8 grams of colorless solid having a melting point of 166° to 168° C. The desired product is identified, such as by elemental analysis.

A further preparation illustrating preparation of a compound according to Method 3 is the preparation of 4-N,N-diethylamino-2-methyl-2'-methoxy-5'-pivalamido-4'-(2,4,6-triisopropylbenzenesulfonamido)-diphenylamine. This method is carried out as follows:

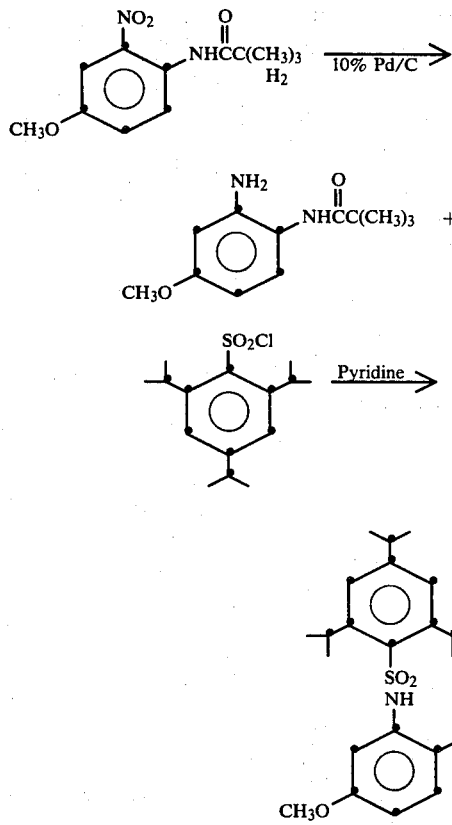

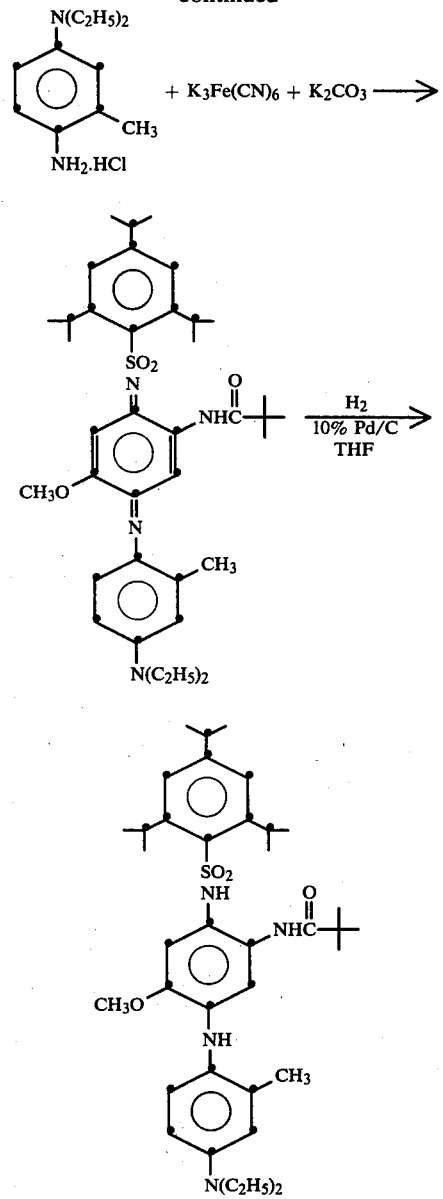

13.3 grams (0.05 mole) of the nitro compound in 150 ml of tetrahydrofuran is reduced at 40 psi hydrogen pressure over 10 percent palladium on charcoal at room temperature (about 20° C.) until hydrogen uptake ceases (1.5 hours). The catalyst is removed by filtration, and the solvent by evaporation, to yield a colorless crystalline solid which is the desired amine. This amine is used directly. The colorless solid is dissolved in 250 ml of pyridine, and the resulting solution cooled in an ice bath. Next, triisopropylbenzenesulfonyl chloride (15.1 grams, 0.05 mole) is added portion-wise to yield a bright-yellow solution which is allowed to warm to room temperature and is stirred overnight (about 18 hours). The mixture is poured into a mixture of ice (400 grams) and concentrated hydrogen chloride (300 ml) to produce a colorless solid. Filtration and recrystallization from acetonitrile produces 18.6 grams of a colorless crystalline solid having a melting point of 177° to 178° C. This desired intermediate is identified, such as by elemental analysis.

Then the following reaction is carried out:

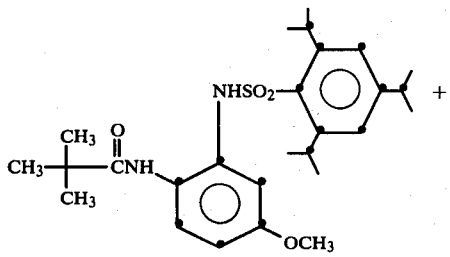

The following solutions are prepared:

Solution A: 10.0 grams (0.02 mole) of the starting intermediate in 150 ml of tetrahydrofuran;

Solution B: 4.2 grams (0.02 mole) of N,N-diethyl-3-methyl-p-phenylenediamine hydrochloride in 60 ml of water;

Solution C: 26.3 grams (0.08 mole) of potassium ferricyanide in 125 ml of water; and, Solution D: 11.0 grams (0.08 mole) of potassium carbonate in 25 ml of water.

Addition of Solution A and then Solution B to Solution D produces no color change. Next, Solution C is added to the previous mixture dropwise in 15 minutes. A green dye is formed. The mixture is stirred for two hours following the addition and then diluted to one liter with water. The dye is extracted into methylene chloride, washed well with water, dried by means of sodium sulfate and evaporated under reduced pressure to yield the crude green dye as a thick oil (approximately 15 grams). The crude dye is dissolved in tetrahydrofuran and reduced over 10 percent palladium on charcoal at 40 psi hydrogen pressure, at room temperature (about 20° C.), until hydrogen uptake ceases (30 minutes). Filtration provides a brown-magenta solution. Solvent is evaporated and replaced with methylene chloride (about 300 ml). The magenta-brown solution is slurried with a filtering composition (Florisil) (10 grams) and filtered to yield a pale green solution. The solvent is evaporated to yield a crude pale green solid. Recrystallization from methanol-water fails to remove the trace of dye present. The sample is repeatedly recrystallized from ether-hexane until constant melting point is reached. The melting point of the desired product is 201° to 202° C.

The color-forming para-sulfonamidodiphenylamine dye precursors and their corresponding sulfonimide dyes are present in a photographic material and process according to the invention in their salt form or non-salt form. The color-forming sulfonamidodiphenylamine dye precursors and their corresponding dyes herein include either of the appropriate forms. Examples of suitable salts of the color-forming para-sulfonamidodiphenylamine dye precursors include para-toluenesulfonate, 1,5-naphthalenedisulfonate and benzenesulfonate salts.

The color-forming para-sulfonamidodiphenylamine dye precursors are useful in a photographic material and process according to the invention in a range of concentrations. Selection of an optimum concentration of color-forming para-sulfonamidodiphenylamine dye precursor or combination of such dye precursors depends upon the desired image, the particular photographic material, processing steps and conditions, other components in the photographic material, and the particular para-sulfonamidodiphenylamine. A useful concentration of para-sulfonamidodiphenylamine is generally within the range of about 0.1 to about 0.6 mole of para-sulfonamidodiphenylamine per mole of photosensitive silver halide in the photographic material. An especially useful concentration of para-sulfonamidodiphenylamine is within the range of about 0.1 to about 0.2 mole of para-sulfonamidodiphenylamine per mole of silver halide in the photographic material. In a photographic element, a useful concentration of color-forming para-sulfonamidodiphenylamine dye precursor is within the range of about 0.5 to about 22 mg of color-forming para-sulfonamidodiphenylamine dye precursor per square decimeter of support, such as a concentration within the range of about 5 to about 11 mg per square decimeter of support.

The hue of the dye produced from the color-forming para-sulfonamidodiphenylamine dye precursor will vary, depending upon such factors as the particular groups on the color-forming para-sulfonamidodiphenylamine dye precursor, processing conditions, other components in the photographic material such as dispersion solvents, and whether a combination of dyes is present in the photographic material or not. The color-forming para-sulfonamidodiphenylamine dye precursor in the photographic material is preferably colorless prior to exposure and processing. Some of the suitable color-forming para-sulfonamidodiphenylamine dye precursors have a slight color, such as a slight yellow color, in the photographic material. This slight color is not considered unacceptable.

The term "colorless" herein means that the color-forming para-sulfonamidodiphenylamine dye precursor in the photographic material does not absorb radiation to an undesired degree in the visible region of the electromagnetic spectrum. In some photographic materials, the color-forming para-sulfonamidodiphenylamine dye precursor absorbs radiation in certain areas of the electromagnetic spectrum which do not adversely affect the desired properties or the desired image formed upon processing.

The color-forming para-sulfonamidodiphenylamine dye precursor generally absorbs electromagnetic radiation outside the visible region of the electromagnetic spectrum before imagewise exposure and processing of the photographic material. The nature of the absorption and degree of absorption of the color-forming para-sulfonamidodiphenylamine dye precursor depends upon the nature, for the most part, of the substituent groups on the para-sulfonamidodiphenylamine.

The photographic materials according to the invention comprise a photosensitive component which consists essentially of photographic silver halide. Examples of useful photographic silver halides are silver chloride, silver bromide, silver bromoiodide, silver chlorobromoiodide, silver iodide and mixtures thereof. The photographic silver halide is generally present in the photographic material in the form of an emulsion which is a dispersion of the photographic silver halide in a suitable binder. The photographic silver halide is present in a range of grain sizes from fine grain to coarse grain. A composition containing the photographic silver halide is prepared by any of the well known procedures in the photographic art, such as described in *Research Disclosure,* December 1978, Item No. 17643.

The photographic material according to the invention contains addenda commonly found to be useful in silver halide photographic materials. These addenda include chemical sensitizers, brighteners, antifoggants, emulsion stabilizers, light absorbing and scattering materials, hardeners, coating aids, plasticizers, lubricants, antistatic materials, matting agents, and development modifiers, as described in *Research Disclosure,* December 1978, Item No. 17643.

The photographic silver halide is generally spectrally sensitized by means of spectral sensitizing dyes, as described in, for example, *Research Disclosure,* December 1978, Item No. 17643. Useful spectral sensitizing dyes in photographic materials according to the invention include such dyes as polymethylene dyes which include the cyanines, merocyanines, complex cyanines and merocyanines (including tri, tetra and polynuclear cyanines and merocyanines), as well as oxonols, hemioxonols, styryls, merostyryls and streptocyanines. Combinations of spectral sensitizing dyes are also useful in photographic materials according to the invention.

The photographic silver halide is useful in a range of concentrations in a photographic material according to the invention. An optimum concentration of photographic silver halide depends upon such factors as the desired image, processing conditions, particular sulfonamidodiphenylamine dye precursor, other components of the photographic material and particular photographic silver halide. A useful concentration of photographic silver halide in the photographic material according to the invention is generally within the range of about 2 to about 7 moles of photographic silver halide per mole of color-forming sulfonamidodiphenylamine dye precursor in the photographic material. The coverage of photographic silver halide is less than otherwise might be useful, due to the enhancing properties of the dye produced upon processing of the photographic material according to the invention.

The color-forming para-sulfonamidodiphenylamine dye precursor is in any suitable location in a photographic material according to the invention which produces the desired dye upon processing. The color-forming para-sulfonamidodiphenylamine dye precursor is, if desired, in a layer contiguous to the layer comprising the photosensitive silver halide. The term "in reactive association" herein means that the photosensitive silver halide and the color-forming sulfonamidodiphenylamine dye precursor are in a location with respect to each other which enables the photographic material according to the invention upon processing to produce a desired dye image and a desired silver image.

Many developing agents are useful for developing an image in a photographic material according to the invention. Any silver halide developing agent is useful according to the invention, provided it comprises a cross-oxidizing developing agent which will cross-oxidize with the color-forming para-sulfonamidodiphenylamine dye precursor. Such a silver halide developer, called herein a cross-oxidizing developing agent, becomes oxidized during development by reducing exposed silver halide to silver metal. The oxidized developer then cross-oxidizes the color-forming para-sulfonamidodiphenylamine dye precursor to form the desired dye.

A cross-oxidizing developing agent (COD) enables the color-forming para-sulfonamidodiphenylamine dye precursor to become oxidized without the color-forming para-sulfonamidodiphenylamine dye precursor itself developing silver. The color-forming sulfonamidodiphenylamine dye precursor is viewed alternatively as an electron transfer agent which shuttles electrons between the developing silver halide and the para-sulfonamidodiphenylamine dye precursor.

The color-forming para-sulfonamidodiphenylamine dye precursor is frequently immobilized in an oil phase in the photographic material. This enables the dye precursor to be dispersed satisfactorily. Alternatively, the color-forming para-sulfonamidodiphenylamine dye precursor is dispersed in a dispersion solvent to produce a desired photographic material. Coupler solvents known in the photographic art are useful for aiding dispersion of the color-forming para-sulfonamidodiphenylamine dye precursor. Examples of useful coupler solvents include N-n-butylacetanilide, diethyl lauramide, di-n-butyl phthalate and 2,4-di-tertiaryamylphenol. The color-forming para-sulfonamidodiphenylamine dye precursor is also usefully loaded into a latex or a non-solvent dispersion is prepared, if desired.

The requirements for a cross-oxidizing developing agents generally are: (a) the developing agent must have sufficient electrochemical potential under the conditions of use to develop exposed silver halide, (b) in its oxidized form, the developing agent must be of such electrochemical potential as to oxidize the color-forming para-sulfonamidodiphenylamine dye precursor, and (c) in its oxidized form, the developing agent must be stable to decomposition by other chemical reactions for a sufficient period to undergo the redox reaction with the color-forming para-sulfonamidodiphenylamine dye precursor. Whether a developing agent is a cross-oxidizing developing agent or not depends upon whether the oxidized form is sufficiently stable and the oxidizing potential is such that an effective transferral of electrons occurs through whatever phase barriers exist during cross-oxidizing development. Whether a particular developing agent meets these requirements depends upon the conditions under which development occurs. Other factors influence whether a particular developing agent is a cross-oxidizing developer, including the pH of the developing composition, the temperature of the development process and the length of development time. Examples of developing agents which are useful as cross-oxidizing developing agents include 3-pyrazolidone developers, such as 1-phenyl-3-pyrazolidone, 1-phenyl-4,4-dimethyl-3-pyrazolidone and 4-hydroxymethyl-4-methyl-1-phenyl-3-pyrazolidone. Such cross-oxidizing developing agents are described in, for example, U.S. Pat. No. 3,938,995. Combinations of non-cross-oxidizing developing agents and cross-oxidizing developing agents are useful, provided a minor proportion of the non-cross-oxidizing developing agent is present, such as less than about 10 percent of the total combination is non-cross-oxidizing developing agent. Examples of combinations of a non-cross-oxidizing developing agent and a cross-oxidizing developing agent include 4-hydroxymethyl-4-methyl-1-phenyl-3-pyrazolidone with a minor proportion of at least one of the following non-cross-oxidizing developing agents: ascorbic acid, hydroquinone and pyrimidine. Selection of an optimum cross-oxidizing silver halide developing agent or developing agent combination will depend upon such factors as the desired image, the particular photosensitive silver halide, processing conditions, and the particular color-forming para-sulfonamidodiphenylamine dye precursor.

A silver halide developing agent or silver halide developing agent combination is incorporated in the photographic material according to the invention, if desired. Generally, the silver halide developing agent is most useful in a processing solution in which the photographic material according to the invention is processed after exposure.

The developing agent is useful in a range of concentration in the photographic material or in a processing composition in which the photographic material according to the invention is processed. A concentration of developing agent in the photographic material is generally within the range of about 0.01 to about 1.0 mole of developing agent per mole of color-forming para-sulfonamidodiphenylamine dye precursor in the photographic material. A useful concentration of developing agent in a processing solution for processing a photographic material containing a color-forming para-sulfonamidodiphenylamine dye precursor is within the range of about 0.5 to about 2 grams of developing agent per liter of processing solution.

The term "developing agent" herein includes compounds which are developing agents or developing agent precursors. That is, those compounds are included which are not developing agents in the photographic material until a condition occurs, such as contact with a suitable activator for the photographic material.

The tone of the silver image and dye image produced in a photographic material according to the invention will vary, depending upon such factors as the silver morphology of the developed silver image, the covering power of the silver materials, the particular dye formed, the particular developing agent, processing conditions, and other components in the photographic material. In photographic materials according to the invention that provide a brown silver image, a dye produced is especially useful which is complementary in hue to the silver image. A combination of dyes and a silver image that produce a neutral-appearing image are generally most useful.

The photographic materials according to the invention comprise a variety of binders alone or in combination. The binders include both naturally occurring substances, such as proteins, for example, gelatin, gelatin derivatives, cellulose derivatives, polysaccharides, such as dextran, and gum arabic; but also include synthetic polymeric materials, such as water-soluble polyvinyl compounds, like poly(vinylpyrrolidone) and acrylamide polymers. Examples of useful binders include those described in, for instance, *Research Disclosure*, December 1978, Item No. 17643.

The photographic elements according to the invention generally contain an overcoat layer, and/or interlayer, and/or subbing layer to provide desired properties. The overcoat layer, for example, increases resistance to abrasion and other markings on the element. The overcoat layer, interlayer or subbing layer contain, alone or in combination, the described binders.

A photographic element according to the invention comprises a variety of supports. Useful supports include those that are resistant to adverse changes in structure due to processing conditions and which do not adversely affect the desired sensitometric properties of the photographic materials. Examples of useful supports include cellulose ester, poly(vinylacetal), poly(ethylene terephthalate) and polycarbonate films, as well as related films and resinous materials. Glass, paper and metal supports are also useful. A flexible support is generally most useful.

Photographic materials according to the invention are generally coated on a suitable support by procedures known in the photographic art. Such procedures include, for example, immersion or dip coating, roller coating, reversal roll coating, airknife coating, doctor blade coating, spray coating, extrusion coating, bead coating, stretch flow coating and curtain coating.

Photographic elements according to the invention are imagewise exposed by means of various forms of energy to produce a developable image. Such forms of energy include those to which the photosensitive silver halide is sensitive, and encompass ultraviolet, visible and infrared regions of the electromagnetic spectrum, as well as electron beam and beta radiation, gamma ray, X-ray, alpha particle, neutron radiation and other forms of corpuscular wave-like radiant energy in either coherent or non-coherent forms. Lasers are useful, for example. Exposures are monochromatic, orthochromatic or panchromatic, depending on the spectral sensitization of the photosensitive silver halide. Imagewise exposure is generally for a sufficient time and intensity to produce a developable latent image in the photographic material.

A photographic element according to the invention is processed in (a) a process which produces a positive dye image, (b) in a process which produces a negative dye image and negative silver image, (c) in a process which produces a negative dye image, or (d) in a process which processes a positive dye image and a positive silver image. The light-sensitive silver halide in the photographic material according to the invention is processed following exposure to form a visible image. This is done, for example, by associating the silver halide at one stage of the process with an aqueous alkaline medium in the presence of a cross-oxidizing developing agent contained in the medium and/or in the photographic material.

To produce a positive dye image, also known as a reversal dye image, according to the invention, it is generally desirable to process the exposed photographic material by means of a non-cross-oxidizing developing composition as a first development step. During this step, the exposed silver halide is reduced to elemental silver by the non-cross-oxidizing developing composition. The non-cross-oxidizing developing composition does not, when oxidized, oxidize the color-forming para-sulfonamidodiphenylamine dye precursor to its corresponding dye.

The non-cross-oxidizing developer composition useful in this step is generally an alkaline solution, preferably an aqueous solution comprising a non-cross-oxidizing developing agent. Non-cross-oxidizing developing agents are known in the photographic art and include many silver halide developing agents which will reduce exposed photosensitive silver halide to silver, but will not oxidize the color-forming para-sulfonamidodiphenylamine dye precursor to a corresponding sulfonimide dye. Examples of useful non-cross-oxidizing developing agents are described in, for example, *Research Disclosure*, December 1978, Item No. 17643. Useful non-cross-oxidizing developers include developer compositions comprising ascorbic acid, hydroquinone, pyrimidine developing agents and a combination of hydroquinone and N-methyl-p-aminophenol.

In a second step of a process for forming a positive dye image according to the invention, fogging of the photographic material is accomplished by exposing the photographic material to light or by chemical fogging by means of chemical fogging agents known in the photographic art.

Following the described fogging step, a second silver halide developing step is carried out. This is carried out by means of a cross-oxidizing developing composition. It is in this step that the color-forming para-sulfonamidodiphenylamine dye precursor is converted to a dye in the image areas. Any silver halide developing composition is useful in this step, provided that it cross-oxidizes the color-forming para-sulfonamidodiphenylamine dye precursor to a desired sulfonimide dye. Such silver halide developing compositions include alkaline solutions comprising a cross-oxidizing silver halide developing agent, preferably a 3-pyrazolidine cross-oxidizing silver halide developing agent. This cross-oxidizing developing agent becomes oxidized during development by reducing exposed or fogged silver halide to silver metal. The oxidized developing agent then cross-oxidizes the color-forming para-sulfonamidodiphenylamine dye precursor to a desired dye. The photographic material, upon processing, contains a concentration of dye in inverse proportion to the amount of exposure of the photographic element. That is, a positive dye image, also described herein as a reversal dye image, is formed.

An especially useful process for producing a positive dye image in an imagewise exposed photographic element according to the invention comprises: (a) developing the exposed photographic element in an alkaline photographic developer in the absence of a cross-oxidizing silver halide developing agent, and then (b) uniformly exposing the resulting element to a flash exposure of light, followed by (c) developing the photographic element in an alkaline, cross-oxidizing developer, comprising an aqueous, alkaline solution of 4-methyl-4-hydroxymethyl-1-phenyl-3-pyrazolidone, and (d) bleaching and fixing the photographic element in a silver halide bleaching and fixing solution to produce a positive dye image in a photographic element. It is generally useful to treat the photographic element by means of a development stop bath after step (a) and before step (b).

Photographic elements according to the invention are also useful for producing negative dye images. Such negative dye images are produced in an exposed photographic element comprising a support having thereon, in reactive association, in binder, (a) photosensitive silver halide, and (b) a color-forming para-sulfonamidodiphenylamine dye precursor by (A) developing the photographic element in an alkaline, cross-oxidizing photographic silver halide developer composition to produce a negative dye image and silver image; then (B) removing at least part of the silver image from the photographic element, such as by bleaching and fixing the silver from the element. Removal of the silver is accomplished by means of bleaching and fixing compositions known in the photographic art. The optimum bleaching and fixing compositions are selected to provide the desired dye image. Suitable bleaching and fixing compositions are described in Grant Haist, *Modern Photographic Processing*, Vol. 2, Chapter 10 (1979).

Photographic elements according to the invention comprising direct-positive photographic silver halide are useful for forming positive, dye images and positive, silver images. A process of producing a positive, dye image and a positive, silver image in an imagewise exposed photographic element comprising a support having thereon, in reactive association, in binder, (a) direct-positive photographic silver halide, and (b) a color-forming para-sulfonamidodiphenylamine dye precursor, comprising (A) developing the photographic element in an alkaline, cross-oxidizing photographic silver halide developing composition; then (B) fixing the resulting photographic element to produce a positive, dye image and a positive, silver image. Useful direct-positive silver halide is described in, for example, *Research Disclosure*, December 1978, Item No. 17643, pages 22 through 31. Fixing the photographic element is accomplished by means of fixing compositions known in the photographic art, such as a sodium thiosulfate fixing composition.

An advantage of the photographic material and process according to the invention is that the dye images produced upon processing possess desired stability to post-processing conditions and visible light exposure. A simple test is useful for establishing the degree of stability which is desired for a dye image produced from a color-forming sulfonamidodiphenylamine dye precursor according to the invention. One such test is a test well known in the photographic art in which a processed photographic element is exposed to a Simulated Average North American Skylight (SANS) with continuous 5400 LUX of exposure at an average temperature of 21° C. at 45 percent relative humidity. A comparison of the stability of the tested dye is then observed. This test is described with respect to specific compounds in the following examples.

When a cross-oxidizing silver halide developing agent is present in the photographic material according to the invention, a developed image is produced after imagewise exposure of the photographic material by contacting the material with an alkaline activator solution which enables development of the exposed silver halide, as well as production of the desired dye. Many alkaline activators are useful for developing an image in a photographic material according to the invention comprising an incorporated cross-oxidizing silver halide developing agent. Alkaline activators which are known to be useful in the photographic art, such as in stabilization processing, are useful for developing an image in the described photographic material according to the invention. Examples of useful alkaline activators include sodium hydroxide, potassium hydroxide, trisodium phosphate.12H$_2$O (pH 12), sodium metaborate (pH 12), disodium phosphate and monosodium phosphate. An optimum alkaline activator will depend upon such factors as the desired image, the particular cross-oxidizing developing agent, processing conditions and the particular color-forming para-sulfonamidodiphenylamine dye precursor. An especially useful alkaline activator comprises trisodium phosphate (pH 12).

The alkaline activator is useful in a range of concentrations. A generally useful concentration of alkaline activator is within the range of about 10 to about 50 grams per liter of activator solution which produces a pH within the range of about 11 to about 12. An optimum concentration of alkaline activator will depend upon such factors as the desired image, the particular activator, processing conditions, particular cross-oxidizing developing agent, particular photosensitive silver halide and particular color-forming para-sulfonamidodiphenylamine dye precursor.

After exposure and processing of the photographic material according to the invention, the photographic material comprises a sulfonimide dye image or, alternatively, a sulfonimide dye image and a silver image. The sulfonimide dye image consists essentially of a sulfonimide dye represented by the formula:

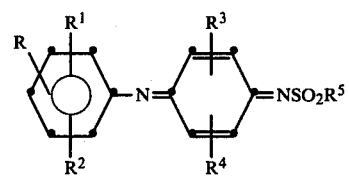

wherein R, R$^1$, R$^2$, R$^3$, R$^4$ and R$^5$ are as defined. Preferably, R$^5$ in this dye is a stabilizer group, such as a 2,4,6-triisopropylphenyl group.

Examples of useful sulfonimide dyes in exposed and processed photographic materials according to the invention are as follows N-(4-N,N-dihexylaminophenyl)-N'-(2,4,6-triisopropylbenzenesulfonyl)-p-benzoquinonediimine represented by the formula:

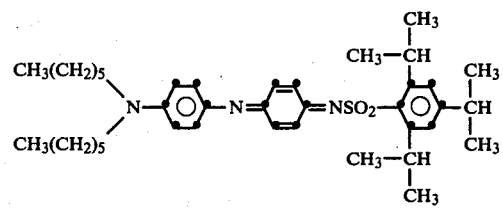

N-(4-n-hexyloxyphenyl)-N'-(2,4,6-triisopropylbenzenesulfonyl)-3-methyl-p-benzoquinonediimine represented by the formula:

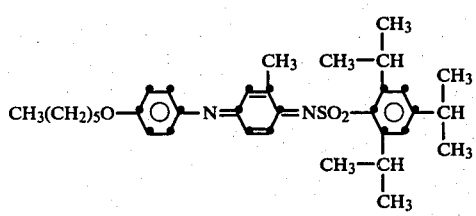

N-(4-N,N-dihexylaminophenyl)-N'-(2,4,6-triisopropylbenzenesulfonyl)-3-methyl-p-benzoquinonediimine represented by the formula:

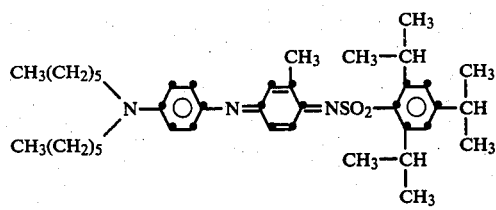

N-(4-N,N-dihexylaminophenyl)-N'-(2,4,6-triisopropylbenzenesulfonyl)-2-methylsulfonyl-p-benzoquinonediimine represented by the formula:

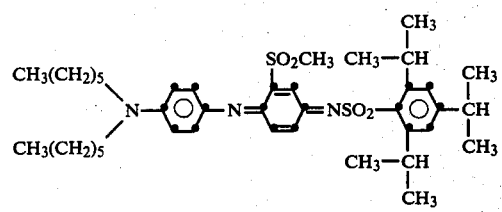

N-(4-N,N-dihexylaminophenyl)-N'-(2,4,6-triisopropylbenzenesulfonyl)-2-pivalamido-p-benzoquinonediimine represented by the formula:

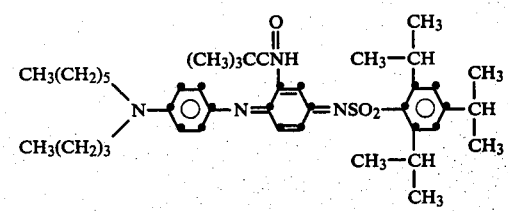

N-(4-n-hexyloxyphenyl)-N'-(2,4,6-triisopropylbenzenesulfonyl)-p-benzoquinonediimine represented by the formula:

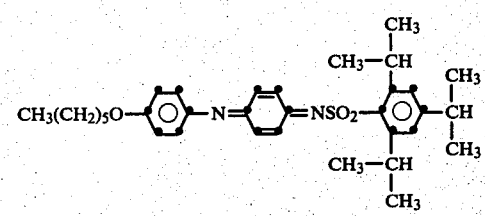

N-[4-N-ethyl-N-(β-methanesulfonamidomethyl)]amino-N'-(2,4,6-triisopropylbenzenesulfonyl)-2,5-dipivalamido-p-benzoquinonediimine represented by the formula:

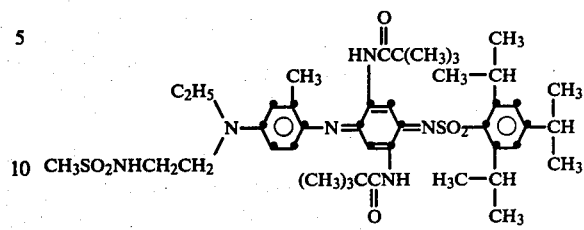

N-(4-n-hexyloxyphenyl)-N'-(2,4,6-triisopropylbenzenesulfonyl)-2,5-dipivalamido-p-benzoquinonediimine represented by the formula:

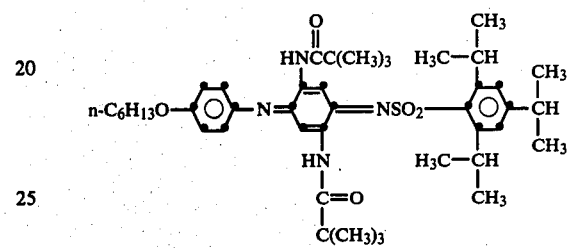

N-(4-methyl-3-methanesulfonamidophenyl)-N'-(2,4,6-triisopropylbenzenesulfonyl)-2-palmitamido-p-benzoquinonediimine represented by the formula:

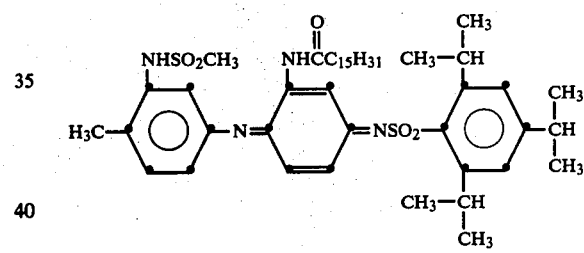

N-(4-methoxy-3-methanesulfonamidophenyl)-N'-(2,4,6-triisopropylbenzenesulfonyl)-2-pivalamido-p-benzenequinonediimine represented by the formula:

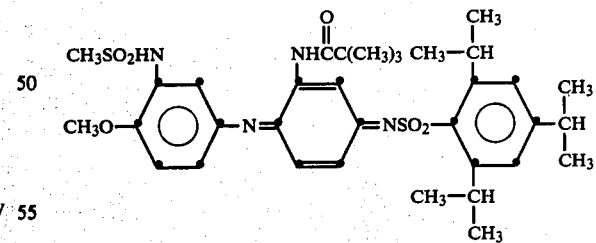

The following examples are included for a further understanding of the invention.

EXAMPLE 1-REVERSAL PROCESSING TO PRODUCE A POSITIVE DYE IMAGE

This illustrates the invention.

A silver bromide gelatino photographic emulsion was prepared containing a dispersion of the following color-forming sulfonamidodiphenylamine dye precursor which is 4-N,N-diethylamino-4'-(2,4,6-triisopropylbenzenesulfonamido)diphenylamine:

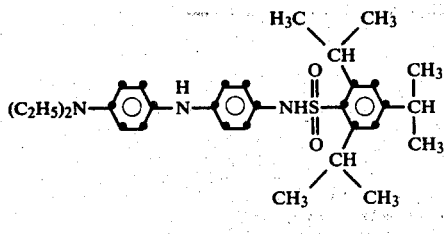

(Dye Precursor 1e)

dispersed in N-n-butylacetanilide. The emulsion was coated on a film support at a silver (Ag+) coverage of 104 mg/ft² (corresponding to 11.2 mg/dm²), 45 mg/ft² of Compound 1e and 90 mg/ft² of N-n-butylacetanilide (corresponding to 4.9 and 9.7 mg/dm², respectively). A sample of the resulting photographic film was imagewise exposed to light in a commercial sensitometer for $10^{-4}$ seconds through a 1.0 neutral density filter to produce a developable latent image in the film. Processing of the exposed film was carried out as follows:

1. Develop for 60 seconds in the following developer solution:
    (a) sodium hexametaphosphate                2.0 g
    (b) N—methyl-p-aminophenol sulfate           6.0 g
    (c) sodium sulfite (anhydrous)              50.0 g
    (d) sodium carbonate (anhydrous)            30.0 g
    (e) hydroquinone                             6.0 g
    (f) potassium bromide                        2.0 g
    (g) sodium thiocyanate                       1.3 g
    (h) sodium hydroxide                         2.0 g
    (i) potassium iodide (0.1 percent solution)  6.0 ml
    (j) water to 1 liter (pH 10.1 to 10.3)
2. Wash in water for 60 seconds.
3. Re-expose by means of a uniform flash to light.
4. Develop 30 seconds in a pH 12 buffered developer containing:
    (a) 4-hydroxymethyl-4-methyl-1-phenyl-3-pyrazolidone (cross-oxidizing developing agent)  1 g/l
    (b) potassium bromide                        1 g/l
    (c) benzyl alcohol                          10 ml/l
    (d) water to 1 liter
5. Wash in water for 60 seconds.
6. Soak in the following bleaching and fixing composition (composition B-F) for 60 seconds:
    (a) (NaFe or NH₄Fe) ethylenediaminetetraacetic acid   40.0 g
    (b) ethylenediaminetetraacetic
    acid (EDTA)                                  4.0 g
    (c) potassium iodide                          1 g
    (d) ammonia (20 percent aqueous solution)    10 ml
    (e) ammonium thiosulfate, crystalline       100 g
    (f) sodium sulfite, anhydrous                 2 g
    (g) sodium or ammonium thiocyanate (20 percent aqueous solution)  50 ml
    (h) water to 1 liter (pH 6.2 to 6.5)
7. Wash 120 seconds in water, and
8. Dry at 22° C. in room air.

A sulfonimide dye only image which was a cyan positive image was produced in the photographic film. The cyan sulfonimide dye image had a maximum density of 1.41 and a minimum density of 0.17. The dye image (from dye precursor 1e) had a maximum absorption at 680 nm.

EXAMPLES 2 THROUGH 11

Dye images were also produced by the procedure of Example 1, with the exception that some of the color-forming sulfonamidodiphenylamine dye precursors from the following Table I were used in place of the dye precursor in Example 1. The absorptions of the resulting dyes are given in the following Table I. These values were obtained by the following procedure.

A sample of the specified color-forming sulfonamidodiphenylamine dye precursor (3 to 18 mg, based on anticipated value of 1.0 for optical density of a solution) was dissolved in butyl acetate (50 ml) or a similar solvent for the dye precursor. This was mixed vigorously with a solution of excess $K_3Fe(CN)_6$ in pH 12 phosphate buffer. The organic phase was washed three times with water and then diluted to 100 ml with butyl acetate for spectrophotometric assay. This procedure is useful for pre-screening color-forming sulfonamidodiphenylamine dye precursors, because the hue, λ-max (wavelength of maximum absorption) and molar extinction (ε) values obtained are comparable to the properties of the image dye produced in a photographic element. It is not probable that a proposed color-forming sulfonamidodiphenylamine dye precursor is useful in a photographic element to form an image dye if the procedure of reaction with $K_3Fe(CN)_6$ produces no suitable dye.

TABLE I

Color-Forming Sulfonamidodiphenylamine Dye Precursors and Their Associated Dyes

| Para-sulfonamidodiphenylamine Dye Precursor | | | Associated Sulfonimide Dye | | |
|---|---|---|---|---|---|
| 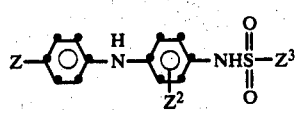 | | | 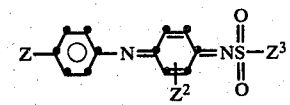 | | |
| Example Number | Dye Number | Z         Z² | Z³ | ε* | λ-max, nm** |
| 2 | 1a | (C₆H₁₃)₂N    H | 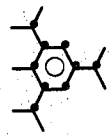 | 4.2 × 10⁴ | 660 |

TABLE I-continued
Color-Forming Sulfonamidodiphenylamine Dye Precursors and Their Associated Dyes

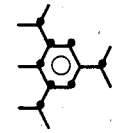

| Example Number | Dye Number | Z | $Z^2$ | $Z^3$ | $\epsilon^*$ | $\lambda$-max, nm** |
|---|---|---|---|---|---|---|
| 3 | 1b | $(C_6H_{13})_2N$ | 3'-$CH_3$ | 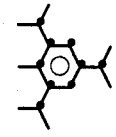 | $4.3 \times 10^4$ | 662 |
| 4 | 1c | $(C_6H_{13})_2N$ | 2'-$SO_2CH_3$ |  | $3.38 \times 10^4$ | 706 |
| 5 | 1d | $(C_6H_{13})_2N$ | 2'-$SO_2$—NH—$(CH_2)_4$—O—[phenyl with $C_5H_{11}$ and $C_5H_{11}$-t] |  | — | 677 |
| 6 | 1f | $(C_2H_5)_2N$ | H | 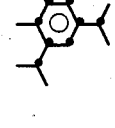 —$OC_{12}H_{25}$ | $3.86 \times 10^4$ | 653 |
| 7 | 1g | $C_6H_{13}O$ | H | 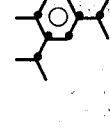 | $8.08 \times 10^3$ | 528 |
| 8 | 1h | $C_6H_{13}O$ | 3'-$CH_3$ | 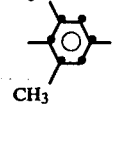 | $1.2 \times 10^4$ | 529 |
| 9 | 1i | $(C_6H_{13})_2N$ | H | [phenyl with $H_3C$, $CH_3$, $CH_3$] | $3.96 \times 10^4$ | 659 |
| 10 | 1j | $(C_6H_{13})_2N$ | 3'-$CH_3$ |  | $4.13 \times 10^4$ | 662 |

TABLE I-continued
Color-Forming Sulfonamidodiphenylamine Dye Precursors and Their Associated Dyes

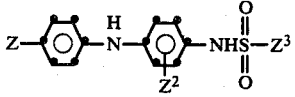

| Example Number | Dye Number | Z | $Z^2$ | $Z^3$ | $\epsilon$* | λ-max, nm** |
|---|---|---|---|---|---|---|
| 11 | 1k | $C_6H_{13}O$ | H | 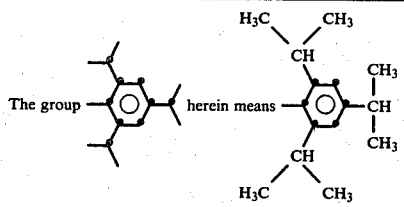 | $1.47 \times 10^4$ | 533 |

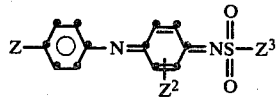

*This signifies in Table I the extinction coefficient in liter mole$^{-1}$ centimeter$^{-1}$.
**This signifies in Table I the maximum absorption in nanometers of the designated dye.

The color-forming p-sulfonamidodiphenylamine dye precursors from which the dyes in Table I are derived are named as follows:

| Dye Number | Color-Forming Sulfonamidodiphenylamine Dye Precursors Corresponding to Noted Dyes in Table I: |
|---|---|
| 1a | 4-N,N—Dihexylamino-4'-(2,4,6-triisopropyl-benzenesulfonamido)diphenylamine |
| 1b | 4-N,N—Dihexylamino-3'-methyl-4'-(2,4,6-triiso-propylbenzenesulfonamido)diphenylamine |
| 1c | 4-N,N—Dihexylamino-2'-methylsulfonyl-4'-(2,4,6-triisopropylbenzenesulfonamido)diphenyl-amine |
| 1d | 4-N,N—Dihexylamino-2'-[δ-(2,4-di-tert-amyl-phenoxy)butylsulfamyl]-4'-benzenesulfonamido-diphenylamine |
| 1f | 4-N,N—Diethylamino-4'-(4-n-dodecyloxybenzene-sulfonamido)diphenylamine |
| 1g | 4-n-Hexyloxy-4'-(2,4,6-triisopropylbenzenesul-fonamido)diphenylamine |
| 1h | 4-n-Hexyloxy-3'-methyl-4'-(2,4,6-triisopropyl-benzenesulfonamido)diphenylamine |
| 1i | 4-N,N—Dihexylamino-4'-(2,4,6-triisopropyl-benzenesulfonamido)diphenylamine |
| 1j | 4-N,N—Dihexylamino-3'-methyl-4'-benzenesulfon-amidodiphenylamine |
| 1k | 4-n-Hexyloxy-4'-benzenesulfonamidodiphenylamine |

EXAMPLES 12 THROUGH 21-FIXING OF ELEMENTS COMPRISING DYES OF SULFONAMIDODIPHENYLAMINES

Film strips (I) prepared as described in Example 1 containing photographic silver halide and containing the color-forming sulfonamidodiphenylamine dye precursors described in the following Table II were processed as follows:

1. Fixed in the following liquid fix solution (fix composition A) for 30 seconds:
   (a) sodium thiosulfate (crystalline) (or ammonium thiosulfate at 160.0 g) — 120.0 g
   (b) potassium metabisulfite — 20.0 g
   (c) water to 1 liter,
2. Washed well in water for 120 seconds,
3. The color-forming sulfonamidodiphenylamine dye precursor was oxidized by immersing the film into the following composition:
   (a) $K_3Fe(CN)_6$ (one percent by weight in benzyl alcohol) — 20 g
   (b) Water to 1 liter (buffered to pH 12), and
4. Washed 120 seconds in water.

A second set of comparative film strips (II) containing the same color-forming sulfonamidodiphenylamine dye precursors were processed in the same way as described for film strips (I), with the exception that the strips were also refixed in fix composition A for 30 seconds following step 4, and then washed in water for 120 seconds.

The percentage density loss on fixing for the dyes was calculated as follows:

$$\% \text{ Density Loss on Fixing} = \frac{D_I - D_{II}}{D_I} \times 100$$

where $D_I$ and $D_{II}$ were densities to complementary light of film strips I and II, respectively.

TABLE II

| | | Sulfonamidodiphenylamine Dye Precursor | | | Associated Sulfonimide Dye | |
|---|---|---|---|---|---|---|
| Example Number | Dye Number | Z | $Z^2$ | $Z^3$ | | Percent Density Loss of Fixing |
| 12 | 1a | $(C_6H_{13})_2N$ | H | 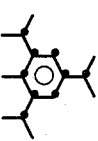 | | 8.9 |
| 13 | 1i | $(C_6H_{13})_2N$ | H | 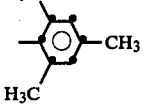 | | 32.6 |
| 14 | 2a | $(C_6H_{13})_2N$ | H |  | | 100.0 |
| 15 | 1b | $(C_6H_{13})_2N$ | 3'-$CH_3$ | 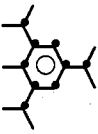 | | 5.5 |
| 16 | 1j | $(C_6H_{13})_2N$ | 3'-$CH_3$ |  | | 45.7 |
| 17 | 1e | $(C_2H_5)_2N$ | H | 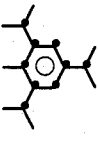 | | 16.2 |
| 18 | 1f | $(C_2H_5)_2N$ | H | 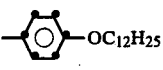 | | 95.7 |
| 19 | 1d | $(C_6H_{13})_2N$ |  | 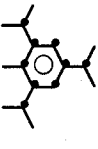 | | 4.0 |
| 20 | 1h | $C_6H_{13}O$ | 3'-$CH_3$ |  | | 0 |
| 21 | 2b | $C_6H_{13}O$ | 3'-$CH_3$ | | | 33.0 |

*Dye precursors were incorporated in solvent which was N,N—diethyl lauramide.

Table II demonstrates that only a 6 to 9 percent dye density loss occurs for the 4'-triisopropylbenzene sulfonamido cyan dye formers 1a and 1b relative to the 46 to 100 percent losses experienced for the non-ballasted homologs. Comparison of the respective losses (16 versus 96 percent) for Compounds 1e and 1f demonstrate the importance of a 4'-ballast with isopropyl groups in both ortho positions of the benzene ring. The excellent stability of Compound 1d (4 percent loss) demonstrates that a bulky substituent in the 2'-ring position conveys stabilization of the image dye after fixing. Furthermore, comparisons of the respective density losses (0 versus 33 percent) for the magenta dye precursor 1h and the dye precursor 2b show the value of the introduction of a triisopropylbenzene sulfonamido ballast at the 4'-position.

EXAMPLES 22 THROUGH 29-PROCESSING OF PHOTOGRAPHIC ELEMENTS

A. Film strips prepared as in Example 1 containing photographic silver halide and containing the color-forming sulfonamidodiphenylamine dye precursor described in the following Table III-A were chemically processed at 22.2° C. according to the sequence:
(1) 30-second fix in fix composition A,
(2) 60-second water wash,
(3) 30 seconds in pH 12.0 $Na_3PO_4$ buffer containing 10 g/liter $K_3Fe(CN)_6$, 10 ml/liter benzyl alcohol, 1 g/liter KBr and water to 1 liter,
(4) 5-minute wash in water, and
(5) 10 seconds in Kodak Photo-Flo®, followed by distilled water wash for 120 seconds.

The processed strips were then mounted on aperture cards and exposed (emulsion side to light source) at 21° C. and 45 percent relative humidity in a SANS test as described using 5400 LUX irradiation for one, three and seven days. Percentage fade of the dyes was calculated as follows:

$$\% \text{ Fade} = \frac{D_{initial} - D_{n\,days}}{D_{initial}} \times 100$$

where D is the density to complementary light after n days. The term SANS herein means Simulated Average Northern American Skylight.

B. Film strips prepared as in Example 1 containing photographic silver halide and containing the color-forming sulfonamidodiphenylamine dye precursors described in Table III-B were photographically processed at 22.2° C. according to the sequence:
(1) Imagewise expose to provide developable latent image,
(2) Activate in the following developer: pH 12 $Na_3PO_4$ buffer containing 1 gram 4-hydroxymethyl-4-methyl-1-phenyl-3-pyrazolidone, 10 ml benzyl alcohol, 1 gram KBr, water to 1 liter, for 30 seconds,
(3) 2-minute wash in water,
(4) 30-second fix in fix composition A,
(5) 2-minute wash in water, and
(6) dry in room air.

The dried strips were mounted and exposed to SANS irradiation, as described above.

TABLE III-A

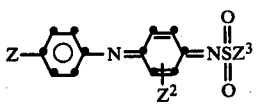

A. Strips Chemically Oxidized - No Development

| Example Number | Dye Number | Z | $Z^2$ | $Z^3$ | % Fade, Days 1 | 3 | 7 |
|---|---|---|---|---|---|---|---|
| 22 | 1a | $(C_6H_{13})_2N$ | H | 2,4,6-triisopropylphenyl | 1.74 | 4.20 | 22.7 |
| 23 | 1i | $(C_6H_{13})_2N$ | H | 2,4,6-trimethylphenyl | 5.64 | 19.4 | 83 |
| 24 | 2a | $(C_6H_{13})_2N$ | H | phenyl | 100 | 100 | 100 |
| 25 | 1b | $(C_6H_{13})_2N$ | 3'-$CH_3$ | 2,4,6-triisopropylphenyl | 1.32 | 2.65 | 9.29 |
| 26 | 1j | $(C_6H_{13})_2N$ | 3'-$CH_3$ | phenyl | 2.8 | 8.5 | 59.2 |

TABLE III-A-continued
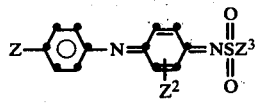
A. Strips Chemically Oxidized - No Development
| Example Number | Dye Number | Z | $Z^2$ | $Z^3$ | % Fade, Days 1 | 3 | 7 |
|---|---|---|---|---|---|---|---|
| 27 | 1c | $(C_6H_{13})_2N$ | 2'-$SO_2CH_3$ | | 4.2 | 13.4 | 77.7 |
| 28 | 1d | $(C_6H_{13})_2N$ | 2'-$SO_2$—NH—$(CH_2)_4$—O—(2,4-di-t-$C_5H_{11}$-phenyl) | | 8.77 | 21.9 | 51.3 |
| 29 | 1e | $(C_2H_5)_2N$ | H | | 3.26 | 6.53 | 18.9 |
| 30 | 3a | $(C_2H_5)_2N$ | H | | 100 | 100 | 100 |
| 31 | 1h | $C_6H_{13}O$ | 3'-$CH_3$ | | 0.75 | 1.51 | 4.54 |
| 32 | 2b | $C_6H_{13}O$ | 3'-$CH_3$ | | 10 | 25 | 58 |
| 33 | 1g | $C_6H_{13}O$ | H | | 2.22 | 4.44 | 13.3 |
| 34 | 1k | $C_6H_{13}O$ | H | | 11.5 | 25.3 | 57.5 |
TABLE III-B
B. Strips Processed Photographically
| Example Number | Dye Number | Z | $Z^2$ | $Z^3$ | % Fade, Days 1 | 3 | 7 |
|---|---|---|---|---|---|---|---|
| 35 | 1b | $(C_6H_{13})_2N$ | 3'-$CH_3$ | | 2.2 | 7.08 | 33.6 |

TABLE III-B-continued
B. Strips Processed Photographically

| Example Number | Dye Number | Z | $Z^2$ | $Z^3$ | % Fade, Days 1 | 3 | 7 |
|---|---|---|---|---|---|---|---|
| 36 | 1a | $(C_6H_{13})_2N$ | H | (2,6-diisopropylphenoxy ring) | 48.9 | 100 | 100 |
| 37 | 1d | $(C_6H_{13})_2N$ | 2'-$SO_2$—NH—$(CH_2)_4$—O—(3,5-di-t-pentylphenyl) | (phenoxy ring) | 16.2 | 50.6 | 70 |
| 38 | 1h | $C_6H_{13}O$ | 3'-$CH_3$ | (2,6-diisopropylphenoxy ring) | 0.78 | 1.56 | 5.46 |
| 39 | 1g | $C_6H_{13}O$ | H | (2,6-diisopropylphenoxy ring) | 1.9 | 4.76 | 14.3 |

The SANS fade results summarized in Table III-A (for coatings chemically oxidized without development) demonstrate the advantage of the triisopropylbenzenesulfonamido ballast. The respective seven-day dye loss for 1a was about 23 percent, compared to almost complete fading (83 to 100 percent) for the non-ballasted dyes. Similarly, the seven-day loss for 1b was 9 percent versus 59 percent for the non-ballasted 1j cyan dye; and, again, a 19 percent loss for Compound 1e as contrasted to 100 percent destruction of the dye of Example 20. The ballasted magenta dye-former 1h faded 4.5 percent in seven-day SANS, whereas the unballasted compound of Example 22 showed 58 percent dye fade.

Density values of the images produced for the listed dyes are as follows (see Table III-B):

| Example Number | Dye | Density Silver (Ag) | Silver (Ag) with Dye |
|---|---|---|---|
| 35 | 1b | 0.42 | 1.56 |
| 36 | 1a | 0.43 | 1.68 |
| 37 | 1d | 0.45 | 1.03 |
| 38 | 1h | 0.37 | 1.40 |
| 39 | 1g | 0.47 | 1.03 |

EXAMPLE 40

A dispersion of a color-forming para-sulfonamidodiphenylamine dye precursor, as designated in the following Table IV-A, was prepared by dissolving one part of the dye precursor in two parts of ethyl acetate and two parts of N-n-butylacetanilide (coupler solvent). This organic mixture was combined with an aqueous gelatin solution and passed through a colloid mill five times. The resulting dispersion was mixed with a gelatino photographic silver halide emulsion and coated at about 11.7 mgs of silver per $dm^2$ on a clear poly(ethylene terephthalate) film support. The resulting photographic element was imagewise exposed to light through a 1.0 neutral density filter in a commercial sensitometer to provide a developable latent image in the element.

The exposed photographic element was processed for 30 seconds at 22° C. in a developer composition comprising:

| | |
|---|---|
| 4-methyl-4-hydroxymethyl-1-phenyl-3-pyrazolidone (cross-oxidizing developing agent) | 1 g |
| $Na_3PO_4.12H_2O$ | 47.52 g |
| KBr | 1 g |
| Water to 1 liter | |

The photographic element was then fixed for two minutes in an aqueous solution of 5-(2-hydroxyethyl)tetrahydro-S-triazine-2(1H)-thione represented by the formula:

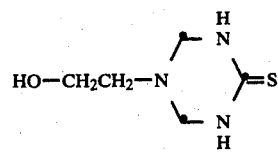

The photographic element was then washed in water for five minutes. The following Table IV-A identifies the color-forming sulfonamidodiphenylamine dye precursor, as well as the maximum absorption of the corresponding dye produced upon processing.

TABLE IV-A

| Example Number | Dye Number | Dmax | Dmin | Absorption: λmax, nm |
|---|---|---|---|---|
| Control | None | 0.19 | 0.14 | (black) |
| 40 | 40a | 0.59 | 0.08 | 460 |
| 41 | 41a | 0.53 | 0.07 | 535 |
| 42 | 42a | 1.16 | 0.20 | 720 |
| 43 | 43a | 0.48 | 0.08 | 430 |

| Example Number | Dye Number | Color-Forming Dye Precursor |
|---|---|---|
| 40 | 40a | 4-methoxy-4'-benzenesulfonamido-diphenylamine |
| 41 | 41a | 4-n-hexyloxy-3'-methyl-4'-benzene-sulfonamidodiphenylamine |
| 42 | 42a | 4-N,N—dihexylamino-4'-benzenesulfon-amidodiphenylamine |
| 43 | 43a | 4-methyl-4'-p-tolylsulfonamido-diphenylamine |

EXAMPLE 44-USE IN DIRECT POSITIVE PHOTOGRAPHIC SILVER HALIDE MATERIAL

A photographic element was prepared by coating the following composition on a poly(ethylene terephthalate) film support:

| | |
|---|---|
| Silver chloroiodide gelatino emulsion (0.4 mole percent I, 0.24 micron cubic grains, surface fogged chemically sensitized, internally doped) | 9.7 mg/dm² (as Ag°) |
| gelatin [hardened by means of bis(vinylsulfonylmethyl)ether] | 43.2 mg/dm² |
| color-forming dye precursor: (dispersed in di-n-butylphthalate) | 5.4 mg/dm² |

CH₃CH₂\N—⟨⟩—NH—⟨⟩—NHSO₂—⟨⟩
CH₃SO₂NH(CH₂)₂ / CH₃  NHCC₇H₁₅-n
                              ‖
                              O

The resulting emulsion layer was overcoated with 10.8 mg/dm² of gelatin hardened with bis(vinylsulfonyl-methyl) ether. The resulting photographic element according to the invention was imagewise exposed to light in a commercial sensitometer to produce a developable image in the emulsion layer. Then the exposed photographic element was processed as follows:

(1) 30 seconds activation in the following composition:
   phosphate buffer (pH 12)
   4-hydroxymethyl-4-methyl-1-phenyl-3-pyrazolidone: 1 g/L.
   benzyl alcohol (1 percent by volume),
(2) 60-second wash in water,
(3) 30-second fix (pH 10) in a fixing composition; and
(4) 120-second wash in water.

This produced a dye image and silver image in the emulsion layer. The processed element was permitted to dry in air. The density of the resulting image was (read through a red filter): Dmax 1.57, Dmin 0.41. A reversal image was produced.

A second sample of the imagewise exposed photographic element was fixed and oxidized by means of potassium ferricyanide to produce a maximum density of 1.40.

EXAMPLE 45-ILLUSTRATIVE DEVELOPERS

A. The following photographic composition was coated on a poly(ethylene terephthalate) film support:

| | |
|---|---|
| AgBr (octahedral grains) | 9.4 mg/dm² (as Ag°) |
| gelatin (binder) | 43.2 mg/dm² |
| bis(vinylsulfonylmethyl) ether (hardener) | 0.4 mg/dm² |
| di-n-butyl phthalate (coupler solvent) | 5.4 mg/dm² |
| color-forming para-sulfonamidodi-phenylamine dye precursor: | 5.4 mg/dm² |

CH₃CH₂\N—⟨⟩—NH—⟨⟩—NHSO₂—⟨⟩
CH₃SO₂NH(CH₂)₂ /      CH₃    NHCC₇H₁₅
                                ‖
                                O (compound 45A)
(Forms a cyan sulfonimide dye)

| | |
|---|---|
| potassium nitrate | 0.6 mg/dm² |

The resulting emulsion layer was then overcoated by means of gelatin (10.8 mg/dm²) hardened by bis(vinyl-sulfonylmethyl) ether (0.108 mg/dm²). The resulting photographic element was imagewise exposed to light through a conventional step tablet in a commercial sensitometer to produce a developable latent image in the emulsion layer. Processing was carried out at 22° C. as follows with agitation of the processing solutions:

| | |
|---|---|
| (a) Development for 30 seconds in the following developer solution: | |
| Na₃PO₄.12H₂O | 47.5 g |
| Na₂SO₃ | 5.0 g |
| N,N—diethylhydroxylamine (85 percent in H₂O) | 1.0 ml |
| 4,4-dimethyl-1-phenyl-3-pyrazolidone | 5 mM |
| KBr | 1.0 g |
| Water (to one liter) (pH 12.0); | |
| (b) Rinse for 60 seconds in water; | |
| (c) Fix for 30 seconds in the following composition: | |
| Na₂S₂O₃.5H₂O | 248 g |
| Na₂CO₃.H₂O | 30.0 g |
| NaHCO₃ | 5.0 g |
| Water to one liter (pH 10.0); | |
| (d) Wash for five minutes in water; and | |
| (e) air dry. | |

A cyan image was produced.

The procedure was repeated, with the exception that the following color-forming sulfonamidodiphenylamine dye precursor was used in place of Compound 45A:

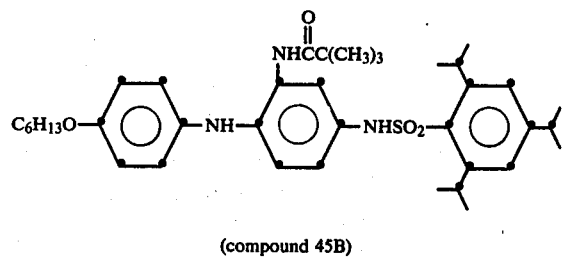

(compound 45B)

-continued (Forms a magenta sulfonimide dye)

Compound 45B was coated in the emulsion layer at 9.6 mg/dm$^2$ with 9.6 mg/dm$^2$ of the coupler solvent.

The image produced with the Compound 45B had a maximum density of 1.25 to green light and a density of 0.41 in the eleventh step of the image. The image produced with the Compound 45A had a maximum density of 1.12 to red light and a density of 0.80 in the eleventh step of the image.

B. The procedure in A. was repeated, with the exception that N-(p-hydroxyphenyl) pyrrolidine was used in place of 4,4-dimethyl-1-phenyl-3-pyrazolidone. The image produced with Compound 45B had a maximum density of 1.41 and an eleventh step density of 0.43. The image produced with Compound 45A had a maximum density of 1.56 and an eleventh step density of 0.59.

C. The procedure in A. was repeated, with the exception that p-N,N-dimethyl-p-aminophenol was used in place of 4,4-dimethyl-1-phenyl-3-pyrazolidone. The image produced with Compound 45B had a maximum density of 0.80 and an eleventh step density of 0.21. The image produced with Compound 45A had a maximum density of 1.42 and an eleventh step density of 0.28.

D. The procedure in A. was repeated, with the exception that N,N,N',N'-tetramethyl-p-phenylenediamine dihydrochloride was used in place of 4,4-dimethyl-1-phenyl-3-pyrazolidone. The image produced with Compound 45B had a maximum density of 1.30 and an eleventh step density of 0.38. The image produced with Compound 45A had a maximum density of 1.34 and an eleventh step density of 0.72.

E. The procedure in A. was repeated, with the exception that 6-amino-1-hydroxyethyl-2,2,4-trimethyltetrahydroquinoline dihydrochloride was used in place of 4,4-dimethyl-1-phenyl-3-pyrazolidone. The image produced with Compound 45B had a maximum density of 1.23 and an eleventh step density of 0.22. The image produced with Compound 45A had a maximum density of 1.32 and an eleventh step density of 0.40.

The maximum density values for each of the images produced in Examples 45A, B, C, D and E comprised about 0.40 neutral metallic silver density.

EXAMPLE 46-MIXED DYE PRECURSORS

A dispersion of 4-N,N-dihexylamino-4'-(2,4,6-triisopropylbenzenesulfonamido)diphenylamine (see Dye 1a in Example 1) was prepared by dissolving 3.0 grams of this first color-forming dye precursor in 8.0 grams of N-n-butylacetanilide. The resulting dispersion was designated Dispersion 46A. A dispersion of 4-n-hexyloxy-3'-methyl-4'-(2,4,6-triisopropylbenzenesulfonamido)diphenylamine (see Dye 1h in Example 1) was prepared by dissolving 4.0 grams of this second color-forming dye precursor in 8.0 grams of N-n-butylacetanilide and 8.0 grams of ethyl acetate. The resulting dispersion was designated Dispersion 46B.

The following first photographic silver bromide composition was coated on a poly(ethylene terephthalate) film support:

| | |
|---|---|
| red-sensitized gelatino photographic silver bromide emulsion | 9.7 mg/dm$^2$ (as Ag°) |
| Dispersion 46A: | |
| 4-N,N—dihexylamino-4'-(2,4,6-triisopropylbenzene- | |
| sulfonamido)diphenylamine (dye precursor) | 4.1 mg/dm$^2$ |
| N—n-butylacetanilide | 10.8 mg/dm$^2$ |
| gelatin (binder) | 43.2 mg/dm$^2$ |
| bis(vinylsulfonylmethyl) ether (hardener) | 0.4 mg/dm$^2$ |

The following interlayer was coated on the resulting first layer:

| | |
|---|---|
| 2,5-di-s-dodecyl-1,4-dihydroxybenzene | 12.9 mg/dm$^2$ |
| gelatin (binder) | 16.8 mg/dm$^2$ |
| bis(vinylsulfonylmethyl)ether (hardener) | 0.17 mg/dm$^2$ |

Then the following second photographic silver bromide composition was coated on the resulting interlayer:

| | |
|---|---|
| green-sensitized gelatino photographic silver bromide emulsion | 9.7 mg/dm$^2$ (as Ag°) |
| Dispersion 46B: | |
| 4-n-hexyloxy-3'-methyl-4'-(2,4,6-triisopropylbenzenesulfonamido)diphenylamine (dye precursor) | 5.4 mg/dm$^2$ |
| N—n-butylacetanilide | 10.8 mg/dm$^2$ |
| gelatin (binder) | 43.2 mg/dm$^2$ |
| bis(vinylsulfonylmethyl) ether | 0.4 mg/dm$^2$ |

The resulting photographic element was designated as Element 46I. A similar photographic element was prepared, with the exception that 2,5-di-s-dodecyl-1,4-dihydroxybenzene was omitted. This photographic element was designated as Element 46II. Each of the photographic elements was imagewise exposed to light by means of a commercial wedge spectrograph to produce a developable latent image in the elements. Then the elements were processed at 22° C. as follows:

| | | |
|---|---|---|
| (1) | Activated 30 seconds in the following composition: | |
| | Na$_3$PO$_4$ (pH 12) (buffer) | |
| | 4-hydroxymethyl-4-methyl-1-phenyl-3-pyrazolidone | 1 g |
| | benzyl alcohol | 10 ml |
| | KBr | 1 g |
| | Water to 1 liter; | |
| (2) | Washed two minutes in water; | |
| (3) | Fixed for 30 seconds in the following fixing composition: | |
| | Sodium thiosulfate (or ammonium thiosulfate 120.0 g) | 160.0 g |
| | Potassium metabisulfite | 20.0 g |
| | Water to 1 liter (pH 4.7); | |
| (4) | Washed two minutes in water; and | |
| (5) | Air dried. | |

The photographic elements produced a developed silver and dye image. The following transmission maximum and minimum dye densities (negative) were observed for the images produced in each element when read by white, red and green light:

| | Dmax | Dmin |
|---|---|---|
| Element 46I: | | |
| White | 1.47 | 0.23 |
| Red | 1.66 | 0.39 |

| | Dmax | Dmin |
|---|---|---|
| Green | 0.31 | 0.09 |
| Element 46II: | | |
| White | 1.47 | 0.10 |
| Red | 1.62 | 0.17 |
| Green | 0.74 | 0.09 |

The data demonstrates that the photographic Elements 46I and 46II provide an overall blue dye-enhanced silver image.

Comparison of the maximum density values for green light indicates color contamination occurred for Element 46II which was a consequence of wandering of the oxidized form of the 3-pyrazolidone developing agent between layers of the element. In Element 46I, pure color separation was observed with no evidence of interlayer oxidized 3-pyrazolidone developing agent wandering.

EXAMPLE 47-COMPARISON OF STABILITY IN PHOTOGRAPHIC MATERIAL

The following color-forming sulfonamidodiphenylamine dye precursors were compared regarding the stability of the corresponding sulfonimide dyes formed in a silver halide photographic material according to the invention:

47A 4-n-Hexyloxy-4'-(2,4,6-triisopropylbenzenesulfonamido)diphenylamine 47B 4-n-Hexyloxy-2'-pivalamido-4'-(2,4,6-triisopropylbenzenesulfonamido)diphenylamine 47C 4-n-Hexyloxy-3'-pivalamido-4'-(2,4,6-triisopropylbenzenesulfonamido)diphenylamine 47D 2',5'-Dipivalamido-4-n-hexyloxy-4'-(2,4,6-triisopropylbenzenesulfonamido)diphenylamine Each one of these dye precursors was incorporated in a photographic silver halide element comprising a subbed poly(ethylene terephthalate) film support having thereon a layer comprising:

(1) silver bromide (0.8 micron grain size, octahedral grains, chemically sensitized by means of sulfur and gold sensitizers) (9.7 mg/dm$^2$ as Ag°), and (2) gelatin (43.2 mg/dm$^2$) hardened with bis(vinylsulfonylmethylether) (one percent by weight) (binder).

The color-forming para-sulfonamidodiphenylamine dye precursor was dispersed in solvent (1:1 to 1:2 parts by weight) in the layer at 3.0 to 16.2 mg/dm$^2$. Each of the photographic elements was uniformly exposed to light in a commercial sensitometer to produce a developable image in the element. Then each photographic element was processed at 22° C. as follows:

(a) Activated for 30 seconds in the following composition:
| | |
|---|---|
| 4-methyl-4-hydroxymethyl-1-phenyl-3-pyrazolidone | 1 g |
| potassium bromide | 1 g |
| benzyl alcohol | 10 ml |
| Na$_3$PO$_4$.12H$_2$O | 47.5 g |
| H$_2$O | to one liter | pH adjusted to 12.0

(b) Washed for 30 seconds in water;

(c) Fixed for 30 seconds in the following composition:
| | |
|---|---|
| Na$_2$S$_2$O$_3$.5H$_2$O | 248 g |
| Na$_2$CO$_3$.H$_2$O | 30.0 g |
| NaHCO$_3$ | 5.0 g |

Water to 1 liter (pH 10.0); and (d) Washed for two minutes in water.

A dye image and a silver image were formed in each of the photographic elements. The developed images had the following maximum and minimum density values:

| Dye Precursor | Dmax (Measured at Maximum Absorption Wavelength) | Dmin (Derived from Unexposed Photographic Element at λmax of dye) |
|---|---|---|
| 47A | 1.03 | 0.08 |
| 47B | 0.72 | 0.08 |
| 47C | 1.49 | 0.07 |
| 47D | 1.71 | 0.08 |

Each of the photographic elements after processing was exposed to light in a SANS test. After seven days, the percentage fade of the dye image was observed. The following results were obtained:

| Dye Precursor | Percent Fade |
|---|---|
| 47A | 13.3 |
| 47B | 5.6 |
| 47C | 26.2 |
| 47D | 0 |

This illustrates the degree of stability to light exhibited by dye images according to the invention.

A separate sample of each of the photographic elements after processing was exposed to a "wet oven test" in which the photographic element was placed in an oven at 60° C. and 70 percent humidity. After seven days, the percentage fade of the dye image was observed. The following results were obtained:

| Dye Precursor | Percent Fade |
|---|---|
| 47A | 100.0 |
| 47B | 6.3 |
| 47C | 100.0 |
| 47D | +1.9 (The dye image for 47D increased in density.) |

This illustrates that the sulfonimide dye images produced from dye precursors 47B and 47D are more stable than the sulfonimide dyes produced from Compounds 47A and 47C.

The following dye precursors were also found to produce corresponding sulfonimide dyes according to the invention:

EXAMPLE 48

4-[N-ethyl-N-(β-methanesulfonamidoethyl)amino]-2-methyl-2',5'-pivalamido-4'-(2,4,6-triisopropylbenzenesulfonamido)diphenylamine

EXAMPLE 49

4-[N-ethyl-N-(β-methanesulfonamidoethyl)amino]-2-methyl-3'-pivalamido-4'-(2,4,6-triisopropylbenzenesulfonamido)diphenylamine

EXAMPLE 50

4-[N-ethyl-N-(β-methanesulfonamidoethyl)amino]-2-methyl-2',5'-dipivalamido-4'-(2,4,6-triisopropylbenzenesulfonamido)diphenylamine

EXAMPLE 51

4-[N-ethyl-N-(β-methanesulfonamidoethyl)amino]-2-methyl-2'-octanamido-4'-(2,4,6-triisopropylbenzenesulfonamido)diphenylamine

EXAMPLE 52

4-N,N-Diethylamino-2-methyl-2'-methoxy-5'-pivalamido-4'-(2,4,6-triisopropylbenzenesulfonamido)diphenylamine

EXAMPLE 53

4-n-Hexyloxy-2'-(N-methyl)acetamido-4'-(2,4,6-triisopropylbenzenesulfonamido)diphenylamine

EXAMPLE 54

4-Methoxy-2-methyl-2'-octanamido-4'-(2,4,6-triisopropylbenzenesulfonamido)diphenylamine

EXAMPLE 55

4-Methoxy-2-methyl-2'-n-hexylureido-4'-(2,4,6-triisopropylbenzenesulfonamido)diphenylamine

EXAMPLE 56

4-n-Hexyloxy-2'-[α-(2,4-di-t-amylphenoxy)hexanamido]-4'-(2,4,6-triisopropylbenzenesulfonamido)diphenylamine

EXAMPLE 57

4-N,N-Dihexylamino-3'-pivalamido-4'-(2,4,6-triisopropylbenzenesulfonamido)diphenylamine

EXAMPLE 58

4-[N-ethyl-N-(β-methanesulfonamidoethyl)amino]-2-methyl-2',5'-didodecyloxy-4'-(2,4,6-triisopropylbenzenesulfonamido)diphenylamine

EXAMPLE 59

The following photographic silver halide composition was prepared and coated on a poly(ethyleneterephthalate) film support:

| | |
|---|---|
| photographic silver bromide gelatino emulsion (0.8 micron grain, octahedral grains, sulfur and gold chemically sensitized) | 9.7 mg/dm$^2$ (as Ag°) |
| gelatin | 43.2 mg/dm$^2$ |
| bis(vinylsulfonylmethyl) ether (hardener) | 0.43 mg/dm$^2$ |
| N—n-butylacetanilide (coupler solvent) | 6.5 mg/dm$^2$ |
| 3-methanesulfonamido-2'-octanamido-4'-(2,4,6-triisopropylbenzenesulfonamido)diphenylamine (dye precursor) | 6.5 mg/dm$^2$ |

The resulting photographic element was imagewise exposed to light through a step tablet and a neutral density filter in a commercial sensitometer to provide a developable latent image in the photographic silver bromide layer. The exposed element was then processed at 22° C. as follows:

(1) Activated for 30 seconds in the following composition:

| | |
|---|---|
| 4-hydroxymethyl-4-methyl-1-phenyl-3-pyrazolidone | 1 g |
| benzyl alcohol | 10 ml |
| pH 12, Na$_3$PO$_4$ buffered water to 1 liter; | |
| (2) Fixed until cleared in the following fixing composition: | |
| NaHCO$_3$ | 0.5 g |
| Na$_2$CO$_3$ | 40 g |
| Na$_2$S$_2$O$_3$ | 100 g |
| Water to 1 liter | |

This provided a developed silver image and dye image having a maximum density of 0.92. The maximum absorption (λmax) was 435 nm. The procedure was repeated, with the exception that in place of fixing the developed photographic element in the noted fixing composition, the photographic element was treated in a bleach-fix composition.

This removed the silver image. The resulting dye image had a maximum density of 0.3 at 435 nm.

EXAMPLES 60 THROUGH 78

The following color-forming para-sulfonamidodiphenylamine dye precursors also provided corresponding sulfonimide dyes produced in a manner similar to that of in Example 59. In each case, the dye precursor was prepared as a dispersion in N-n-butylacetanilide (weight ratio of 1:1 to 1:2) and coated in the photographic silver halide layer at 3.8 to 16.2 mg/dm$^2$ at the appropriate concen- tration to produce a dye and silver image density of about 2.0. The development step was carried out at 26° to 27° C. in an aqueous processing solution (buffered to pH 12.2) containing 1 gram per liter of 4-hydroxymethyl-4-methyl-1-phenyl-3-pyrazolidone (cross-oxidizing developing agent). The maximum absorption wavelength of each of the corresponding sulfonimide dyes formed is given for each of the dye precursors. Many of the ionizable 3-methanesulfonamido substituted dye precursors gave improved reactivity relative to the corresponding 4-methoxy compounds.

EXAMPLE 60

3-Methanesulfonamido-4-methoxy-2'-octanamido-4'-(2,4,6-triisopropylbenzenesulfonamido)diphenylamine (475 nm)

EXAMPLE 61

3-(N-methyl)methanesulfonamido-4-methoxy-2'-octanamido-4'-(2,4,6-triisopropylbenzenesulfonamido)diphenylamine (472 nm)

EXAMPLE 62

3-Methanesulfonamido-4-methoxy-2'-pivalamido-4'-(2,4,6-triisopropylbenzenesulfonamido)diphenylamine (478 nm)

EXAMPLE 63

4-Methyl-2'-palmitamido-4'-(2,4,6-triisopropylbenzenesulfonamido)diphenylamine (489 nm)

EXAMPLE 64

3-Methanesulfonamido-2'-octanamido-4'-(2,4,6-triisopropylbenzenesulfonamido)diphenylamine (429 nm)

EXAMPLE 65

3-(N-methyl)methanesulfonamido-2'-octanamido-4'-(2,4,6-triisopropylbenzenesulfonamido)diphenylamine (430 nm)

EXAMPLE 66

3-Methanesulfonamido-2'-palmitamido-4'-(2,4,6-triisopropylbenzenesulfonamido)diphenylamine (429 nm)

EXAMPLE 67

3-Methanesulfonamido-4-methyl-2'-palmitamido-4'-(2,4,6-triisopropylbenzenesulfonamido)diphenylamine (438 nm)

EXAMPLE 68

3-Methanesulfonamido-4,6-dimethyl-2'-palmitamido-4'-(2,4,6-triisopropylbenzenesulfonamido)diphenylamine (433 nm)

EXAMPLE 69

3-Methanesulfonamido-6-methoxy-2'-octanamido-4'-(2,4,6-triisopropylbenzenesulfonamido)diphenylamine (419 nm)

EXAMPLE 70

3-Acetamido-2'-octanamido-4'-(2,4,6-triisopropylbenzenesulfonamido)diphenylamine (429 nm)

EXAMPLE 71

4-[N-(β-methylsulfonamido)ethyl-N-ethyl]amino-2-methyl-2'-octanamido-4'-(2,4,6-triisopropylbenzenesulfonamido)diphenylamine (641 nm)

EXAMPLE 72

4-[N-(β-N'-methylmethylsulfonamido)ethyl-N-ethyl]amino-2-methyl-2'-octanamido-4'-(2,4,6-triisopropylbenzenesulfonamido)diphenylamine (642 nm)

EXAMPLE 73

3-(4-Dodecyloxybenzene)sulfonamido-4'-(2,4,6-triisopropylbenzenesulfonamido)diphenylamine (484 nm)

EXAMPLE 74

3-(2,4-Ditert-amylphenoxy)acetamido-4'-(2,4,6-triisopropylbenzenesulfonamido)diphenylamine (479 nm)

Example 75

4-Methoxy-2-methyl-2'-octanamido-4'-(2,4,6-triisopropylbenzenesulfonamido)diphenylamine (515 nm)

EXAMPLE 76

4-n-Hexyloxy-2'-[α-dodecyl-α-(3-tertbutyl-4-acetoxyphenoxy)acetamido]-4'-(2,4,6-triisopropylbenzenesulfonamido)diphenylamine (505 nm)

EXAMPLE 77

4-n-Hexyloxy-2'-[α-dodecyl-α-(3-tertbutyl-4-hydroxyphenoxy)acetamido]-4'-(2,4,6-triisopropylbenzenesulfonamido)diphenylamine (504 nm)

EXAMPLE 78

2,4-Dimethoxy-2'-octanamido-4'-(2,4,6-triisopropylbenzenesulfonamido)diphenylamine (533 nm)

Other color-forming para-sulfonamidodiphenylamine dye precursors that are useful for forming sulfonimide dyes are described in copending U.S. application Ser. No. 280,627, of R. S. Gabrielsen, P. A. Graham, J. E. Klijanowicz and M. H. Stern, now abandoned, filed July 6, 1981 with the present application, and entitled "Color-Forming Sulfonamidodiphenylamines and Corresponding Sulfonimide Dyes", the disclosure of which is incorporated herein by reference.

The invention has been described in detail with particular reference to preferred embodiments thereof, but it will be understood that variations and modifications can be effected within the spirit and scope of the invention.

What is claimed is:

1. In a photographic element comprising a support having thereon, in reactive association, in binder,
    (a) photosensitive silver halide; and
    (b) a color-forming dye precursor which is imagewise converted upon exposure and processing of said element to a dye by cross-oxidation by means of a cross-oxidizing silver halide developing agent;
the improvement comprising
    as said dye precursor, a color-forming parasulfonamidodiphenylamine which is free of sulfonamido groups in an ortho position relative to the amino —NH— separating the two aryl rings and which forms a sulfonimide dye.

2. A photographic element as in claim 1 wherein said color-forming para-sulfonamidodiphenylamine is represented by the formula:

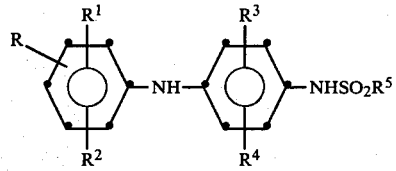

wherein:

R is in the meta or para position and is an electron donating substituent selected from

alkoxy containing 1 to 20 carbon atoms, aryloxy containing 6 to 20 carbon atoms, sulfonamido and carboxamido groups;

$R^1$ is in the ortho or meta position and is hydrogen, alkyl containing 1 to 3 carbon atoms, carbamoyl, alkoxy containing 1 to 3 carbon atoms, sulfonylalkyl containing 1 to 3 carbon atoms, sulfonylaryl containing 6 to 12 carbon atoms, chlorine, bromine, iodine or fluorine;

$R^2$ is hydrogen, alkyl containing 1 to 3 carbon atoms, carbamoyl, alkoxy containing 1 to 20 carbon atoms, sulfonylalkyl containing 1 to 5 carbon atoms, sulfonylaryl containing 6 to 12 carbon atoms, chlorine, bromine, iodine or fluorine;

$R^3$ is hydrogen, alkyl containing 1 to 20 carbon atoms, haloalkyl containing 1 to 20 carbon atoms, alkoxy containing 1 to 20 carbon atoms, an ester containing 1 to 20 carbon atoms, carboxy, carboxamido, chlorine, bromine, iodine, fluorine, carbamoyl, sulfonic acid, sulfamyl, sulfonylalkyl containing 1 to 5 carbon atoms, ureido or a carbocyclic group containing 5 to 12 carbon atoms;

$R^4$ is hydrogen, alkyl containing 1 to 20 carbon atoms, alkoxy containing 1 to 20 carbon atoms, an ester represented by the formula

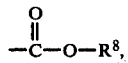

carboxy, carboxamido, chlorine, bromine, iodine, fluorine, carbamoyl, sulfonic acid, sulfamyl, sulfonylalkyl containing 1 to 3 carbon atoms, ureido and a carbocyclic group containing 5 to 12 carbon atoms;

$R^5$ is individually alkyl containing 1 to 20 carbon atoms or aryl containing 6 to 20 carbon atoms;

$R^6$ is hydrogen, alkyl containing 1 to 20 carbon atoms,

aryl containing 6 to 20 carbon atoms, or represents, with $R^7$, atoms completing a 5- or 6-member heterocyclic group;

$R^7$ is alkyl containing 1 to 20 carbon atoms, carbamoyl, carboxamido, or represents, with $R^6$, atoms completing a 5- or 6-member heterocyclic group;

$R^8$ is alkyl containing 1 to 4 carbon atoms; and $R^{64}$ is alkyl containing 1 to 20 carbon atoms.

3. A photographic element as in claim 2 wherein $R^5$ is 2,4,6-triisopropylphenyl.

4. A photographic element as in claim 1 wherein said color-forming para-sulfonamidodiphenylamine consists essentially of 4-N,N-dihexylamino-4'-(2,4,6-triisopropylbenzenesulfonamido)diphenylamine represented by the formula:

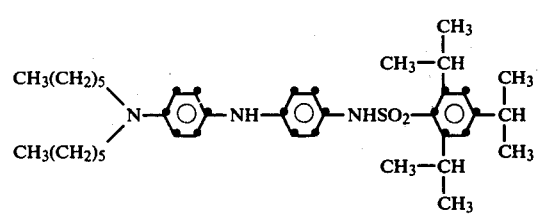

5. A photographic element as in claim 1 wherein said color-forming para-sulfonamidodiphenylamine consists essentially of 4-n-hexyloxy-3'-methyl-4'-(2,4,6-triisopropylbenzenesulfonamido)diphenylamine represented by the formula:

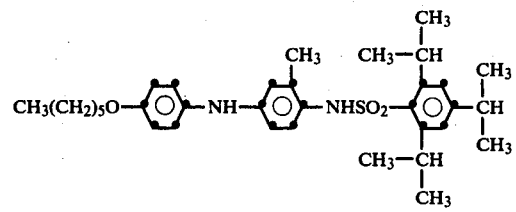

6. A photographic element as in claim 1 wherein said color-forming para-sulfonamidodiphenylamine consists essentially of 4-N,N-dihexylamino-3'-methyl-4'-(2,4,6-triisopropylbenzenesulfonamido)diphenylamine represented by the formula:

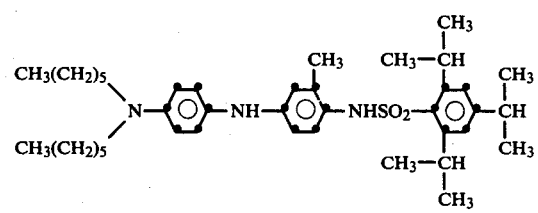

7. A photographic element as in claim 1 wherein said color-forming para-sulfonamidodiphenylamine consists essentially of 4-N,N-dihexylamino-2'-methylsulfonyl-4'-(2,4,6-triisopropylbenzenesulfonamido)diphenylamine represented by the formula:

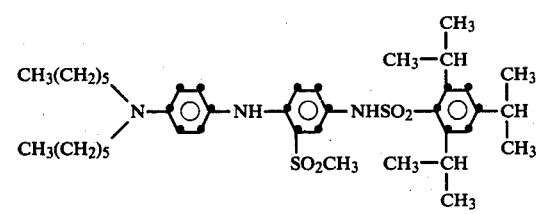

8. A photographic element as in claim 1 wherein said color-forming para-sulfonamidodiphenylamine consists essentially of 3-methanesulfonamido-4-methoxy-2'-pivalamido-4'-(2,4,6-triisopropylbenzenesulfonamido)-diphenylamine represented by the formula:

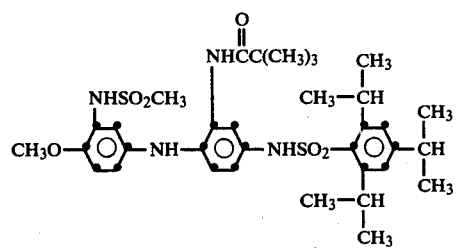

9. A photographic element as in claim 1 wherein said color-forming para-sulfonamidodiphenylamine consists essentially of 4-[N-ethyl-N-($\beta$-methanesulfonamidoethyl)amino]-2-methyl-2',5'-dipivalamido-4'-(2,4,6-triisopropylbenzenesulfonamido)diphenylamine represented by the formula:

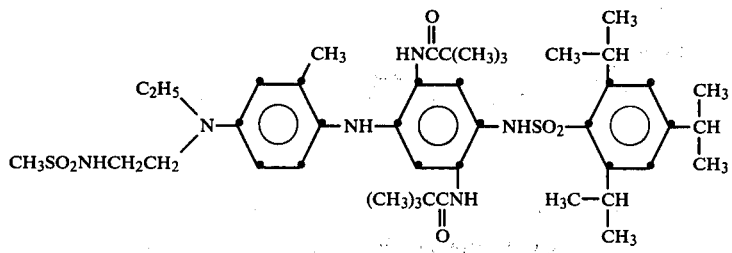

10. A photographic element as in claim 1 also comprising (c) a cross-oxidizing photographic silver halide developing agent.

11. A photographic element as in claim 1 wherein said binder is a gelatino binder.

12. In a photographic element comprising a support having thereon, in reactive association, in a gelatino binder,
(a) photosensitive silver halide; and
(b) a color-forming dye precursor which is imagewise converted upon exposure and processing of said element to a dye by cross-oxidation by means of a cross-oxidizing silver halide developing agent;
the improvement comprising
as said dye precursor, a para-sulfonamidodiphenylamine consisting essentially of 4-N,N-dihexylamino-4'-(2,4,6-triisopropylbenzenesulfonamido)diphenylamine.

13. In a photographic element comprising a support having thereon, in reactive association, in a gelatino binder,
(a) photosensitive silver halide; and
(b) a color-forming dye precursor which is imagewise converted upon exposure and processing of said element to a dye by cross-oxidation by means of a cross-oxidizing silver halide developing agent;
the improvement comprising
as said dye precursor, a color-forming parasulfonamidodiphenylamine consisting essentially of 4-n-hexyloxy-3'-methyl-4'-(2,4,6-triisopropylbenzenesulfonamido)diphenylamine.

14. In a photographic element comprising a support having thereon, in reactive association, in a gelatino binder,
(a) photosensitive silver halide; and
(b) a color-forming dye precursor which is imagewise converted upon exposure and processing of said element to a dye by cross-oxidation by means of a cross-oxidizing silver halide developing agent;
the improvement comprising
as said dye precursor, a color-forming sulfonamidodiphenylamine consisting essentially of 4-[N-ethyl-N-(β-methanesulfonamidoethyl)amino]-2-methyl-2',5'-dipivalamido-4'-(2,4,6-triisopropylbenzenesulfonamido)diphenylamine represented by the formula:

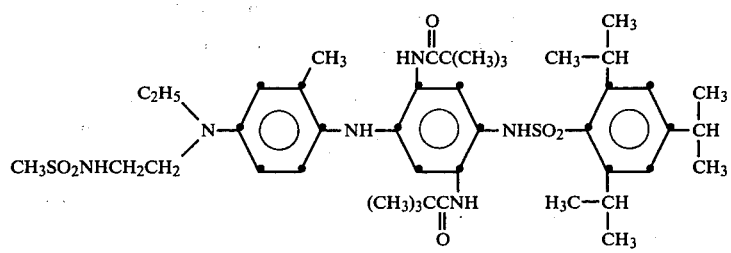

15. In a photographic element comprising a support having thereon, in reactive association, in a gelatino binder,
(a) photosensitive silver halide; and
(b) a color-forming dye precursor which is imagewise converted upon exposure and processing of said element to a dye by cross-oxidation by means of a cross-oxidizing silver halide developing agent;
the improvement comprising
as said dye precursor, a color-forming sulfonamidodiphenylamine consisting essentially of 4-n-hexyloxy-2',5'-dipivalamido-4'-(2,4,6-triisopropylbenzenesulfonamido)diphenylamine represented by the formula:

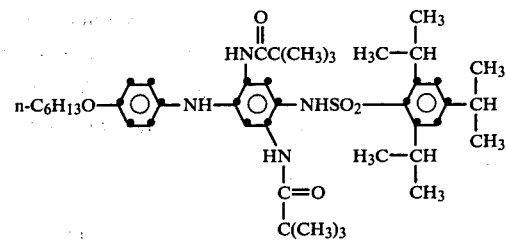

16. In a photographic composition comprising:
(a) photosensitive silver halide; and
(b) a color-forming dye precursor which is imagewise converted upon exposure and processing of said composition to a dye by cross-oxidation by means of a cross-oxidizing silver halide developing agent;
the improvement comprising
as said dye precursor, a color-forming parasulfonamidodiphenylamine which is free of sulfonamido groups in an ortho position relative to the amino —NH— separating the two aryl rings and which forms a sulfonimide dye.

17. A photographic composition as in claim 16 also comprising a binder.

18. A photographic composition as in claim 16 also comprising (c) a cross-oxidizing silver halide developing agent.

19. A photographic composition as in claim 16 also comprising (c) a 3-pyrazolidone cross-oxidizing silver halide developing agent.

20. A photographic composition as in claim 16 wherein said color-forming para-sulfonamidodiphenylamine is represented by the formula:

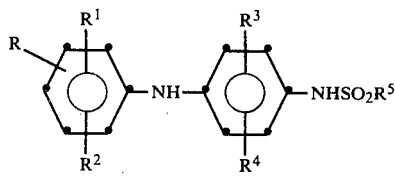

wherein:

R is in the meta or para position and is an electron donating substituent selected from

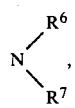

alkoxy containing 1 to 20 carbon atoms, aryloxy containing 6 to 20 carbon atoms, sulfonamido and carboxamido groups;

$R^1$ is in the ortho or meta position and is hydrogen, alkyl containing 1 to 3 carbon atoms, carbamoyl, alkoxy containing 1 to 3 carbon atoms, sulfonylalkyl containing 1 to 3 carbon atoms, sulfonylaryl containing 6 to 12 carbon atoms, chlorine, bromine, iodine or fluorine;

$R^2$ is hydrogen, alkyl containing 1 to 3 carbon atoms, carbamoyl, alkoxy containing 1 to 3 carbon atoms, sulfonylalkyl containing 1 to 5 carbon atoms, sulfonylaryl containing 6 to 12 carbon atoms, chlorine, bromine, iodine or fluorine;

$R^3$ is hydrogen, alkyl containing 1 to 20 carbon atoms, haloalkyl containing 1 to 3 carbon atoms, alkoxy containing 1 to 20 carbon atoms, an ester containing 1 to 20 carbon atoms, carboxy, carboxamido, chlorine, bromine, iodine, fluorine, carbamoyl, sulfonic acid, sulfamyl, sulfonylalkyl containing 1 to 5 carbon atoms, ureido or a carbocyclic group containing 5 to 12 carbon atoms;

$R^4$ is hydrogen, alkyl containing 1 to 3 carbon atoms, alkoxy containing 1 to 20 carbon atoms, an ester represented by the formula:

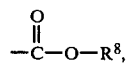

carboxy, carboxamido, chlorine, bromine, iodine, fluorine, carbamoyl, sulfonic acid, sulfamyl, sulfonylalkyl containing 1 to 3 carbon atoms, ureido and a carbocyclic group containing 5 to 12 carbon atoms;

$R^5$ is alkyl containing 1 to 20 carbon atoms or aryl containing 6 to 20 carbon atoms;

$R^6$ is hydrogen, alkyl containing 1 to 20 carbon atoms,

aryl containing 6 to 20 carbon atoms, or represents, with $R^7$, atoms completing a 5- or 6-membered heterocyclic group;

$R^7$ is alkyl containing 1 to 20 carbon atoms, carbamoyl, carboxamido, or represents, with $R^6$, atoms completing a 5- or 6-membered heterocyclic group;

$R^8$ is alkyl containing 1 to 4 carbon atoms; and $R^{64}$ is alkyl containing 1 to 20 carbon atoms.

21. A photographic composition as in claim 16 wherein $R^5$ is 2,4,6-triisopropylphenyl.

22. A photographic composition as in claim 16 wherein said para-sulfonamidodiphenylamine consists essentially of 4-N,N-dihexylamino-4'-(2,4,6-triisopropylbenzenesulfonamido)diphenylamine represented by the formula:

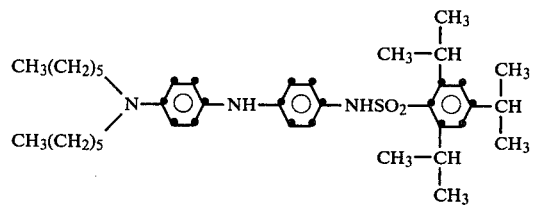

23. A photographic composition as in claim 16 wherein said para-sulfonamidodiphenylamine consists essentially of 4-n-hexyloxy-3'-methyl-4'-(2,4,6-triisopropylbenzenesulfonamido)diphenylamine represented by the formula:

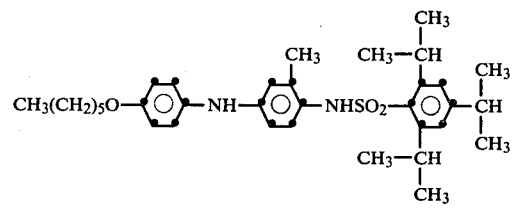

24. A photographic composition as in claim 16 wherein said para-sulfonamidodiphenylamine consists essentially of 4-N,N-dihexylamino-3'-methyl-4'-(2,4,6-triisopropylbenzenesulfonamido)diphenylamine represented by the formula:

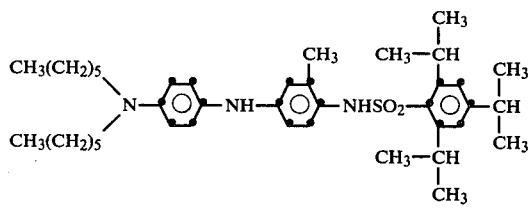

25. A photographic composition as in claim 16 wherein said para-sulfonamidodiphenylamine consists essentially of 4-N,N-dihexylamino-2'-methylsulfonyl-4'-(2,4,6-triisopropylbenzenesulfonamido)diphenylamine represented by the formula:

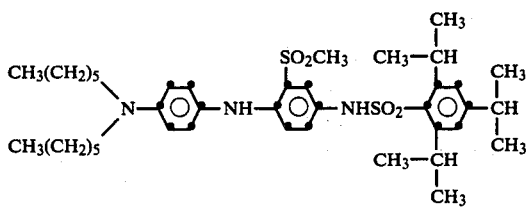

26. In a photographic composition comprising, in a gelatino binder,
 (a) photosensitive silver halide; and
 (b) a color-forming dye precursor which is imagewise converted upon exposure and processing of said element to a dye by cross-oxidation by means of a cross-oxidizing silver halide developing agent;
the improvement comprising
 as said dye precursor, a para-sulfonamidodiphenylamine consisting essentially of 4-N,N-dihexylamino-4'-(2,4,6-triisopropylbenzenesulfonamido)diphenylamine.

27. In a photographic composition comprising, in a gelatino binder,
 (a) photosensitive silver halide; and
 (b) a color-forming dye precursor which is imagewise converted upon exposure and processing of said element to a dye by cross-oxidation by means of a cross-oxidizing silver halide developing agent;
the improvement comprising
 as said dye precursor, a para-sulfonamidodiphenylamine consisting essentially of 4-n-hexyloxy-3'-methyl-4'-(2,4,6-triisopropylbenzenesulfonamido)-diphenylamine.

28. In a photographic composition comprising:
 (a) photosensitive silver halide; and
 (b) a color-forming dye precursor which is imagewise converted upon exposure and processing of said composition to a dye by cross-oxidation by means of a cross-oxidizing silver halide developing agent;
the improvement comprising
 as said dye precursor, a para-sulfonamidodiphenylamine consisting essentially of 4-[N-ethyl-N-(β-methanesulfonamidoethyl)amino]-2-methyl-2',5'-dipivalamido-4'-(2,4,6-triisopropylbenzenesulfonamido)diphenylamine represented by the formula:

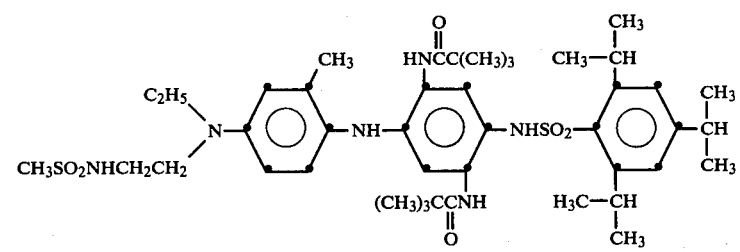

29. In a photographic composition comprising:
 (a) photosensitive silver halide; and
 (b) a color-forming dye precursor which is imagewise converted upon exposure and processing of said composition to a dye by cross-oxidation by means of a cross-oxidizing silver halide developing agent;
the improvement comprising
 as said dye precursor, a para-sulfonamidodiphenylamine consisting essentially of 4-n-hexyloxy-2',5'-dipivalamido-4'-(2,4,6-triisopropylbenzenesulfonamido)diphenylamine represented by the formula:

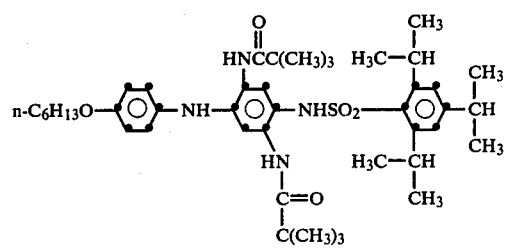

30. A process of producing a negative dye image and a negative silver image in an imagewise exposed photographic element comprising a support having thereon, in reactive association, in binder,
 (a) photosensitive silver halide, and
 (b) a color-forming para-sulfonamidodiphenylamine dye precursor which is free of sulfonamido groups in an ortho position relative to the amino —NH— separating the two aryl rings and which is converted upon processing of said element to a sulfonimide dye by cross-oxidation by means of a cross-oxidizing silver halide developing agent;
said process comprising:
 (A) developing said photographic element in an alkaline, cross-oxidizing, photographic silver halide developer composition to produce a negative dye image and silver image.

31. A process as in claim 30 wherein said alkaline, cross-oxidizing developer composition comprises a 1-phenyl-3-pyrazolidine, cross-oxidizing, photographic silver halide developing agent.

32. A process of producing a negative dye image and a silver image in an imagewise exposed photographic element comprising a support having thereon, in reactive association, in a gelatino binder,
 (a) photosensitive silver halide; and
 (b) a color-forming para-sulfonamidodiphenylamine dye precursor consisting essentially of 4-N,N-dihexylamino-4'-(2,4,6-triisopropylbenzenesulfonamido)diphenylamine;
said process comprising:
 (A) developing said photographic element in an aqueous, alkaline, cross-oxidizing, photographic silver halide developer solution comprising a cross-oxidizing photographic silver halide developing agent consisting essentially of 4-methyl-4-hydroxymethyl-1-phenyl-3-pyrazolidone.

33. A process of producing a negative dye image and a silver image in an imagewise exposed photographic element comprising a support having thereon, in reactive association, in a gelatino binder, (a) photosensitive silver halide;
(b) a color-forming para-sulfonamidodiphenylamine dye precursor consisting essentially of 4-n-hexyloxy-3'-methyl-4'-(2,4,6-triisopropylbenzenesulfonamido)diphenylamine;

said process comprising:
(A) developing said photographic element in an aqueous, alkaline, cross-oxidizing, photographic silver halide developer solution comprising a cross-oxidizing photographic silver halide developing agent consisting essentially of 4-methyl-4-hydroxymethyl-1-phenyl-3-pyrazolidone.

34. A process of producing a positive dye image in an imagewise exposed photographic element comprising a support having thereon, in reactive association, in a binder,
(a) photosensitive silver halide; and
(b) a color-forming para-sulfonamidodiphenylamine dye precursor which is free of sulfonamido groups in an ortho position in relation to the amine —NH— separating the two aryl rings and which is converted upon processing of said element to a sulfonimide dye by cross-oxidation by means of a cross-oxidizing photographic silver halide developing agent;

said process comprising the steps:
(A) developing a silver image in said photographic element by means of an alkaline, photographic silver halide developer in the absence of a cross-oxidizing, photographic silver halide developing agent;
(B) fogging the resulting element;
(C) producing a dye image in the photographic element by means of an alkaline, cross-oxidizing, photographic silver halide developer; and
(D) bleaching and fixing the photographic element by means of a silver halide bleaching and fixing solution;

to produce a positive sulfonimide dye image in the photographic element.

35. A process as in claim 34 wherein said fogging is performed by means of a uniform flash exposure.

36. A process as in claim 34 wherein said photographic element after step (A) and before step (B) is treated by means of a photographic development stop bath.

37. A process of producing a positive dye image in an imagewise exposed photographic element comprising a support having thereon, in reactive association, in a gelatino binder,
(a) photosensitive silver halide gelatino emulsion; and
(b) a color-forming sulfonamidodiphenylamine dye precursor consisting essentially of 4-n-hexyloxy-3'-methyl-4'-(2,4,6-triisopropylbenzenesulfonamido)-diphenylamine;

said process comprising the steps:
(A) developing said photographic element in an alkaline, photographic developer in the absence of a cross-oxidizing, photographic silver halide developing agent;
(B) treating the photographic element by means of a photographic development stop bath;
(C) fogging the resulting element;
(D) producing a dye image in the photographic element by means of an alkaline, cross-oxidizing, photographic silver halide developer comprising an alkaline solution of 4-methyl-4-hydroxymethyl-1-phenyl-3-pyrazolidone, and then
(E) bleaching and fixing the photographic element in a silver halide bleaching and fixing solution;

to produce a positive sulfonimide dye image in the photographic element.

38. A process of producing a positive dye image in an imagewise exposed photographic element comprising a support having thereon, in reactive association, in a gelatino binder,
(a) photosensitive silver halide gelatino emulsion; and
(b) a color-forming sulfonamidodiphenylamine dye precursor consisting essentially of 4-N,N-dihexylamino-4'-(2,4,6-triisopropylbenzenesulfonamido)diphenylamine;

said process comprising the steps:
(A) developing said photographic element in an alkaline, photographic silver halide developer in the absence of a cross-oxidizing, photographic silver halide developing agent;
(B) treating the photographic element by means of a photographic development stop bath;
(C) fogging the resulting element;
(D) producing a dye image in the photographic element by means of an alkaline, cross-oxidizing, photographic silver halide developer comprising an alkaline solution of 4-methyl-4-hydroxymethyl-1-phenyl-3-pyrazolidone, and then
(E) bleaching and fixing the photographic element in a silver halide bleaching and fixing solution;

to produce a positive sulfonimide dye image in the photographic element.

39. A process of producing a negative dye image in an imagewise exposed photographic element comprising a support having thereon, in reactive association, in a binder,
(a) photosensitive silver halide, and
(b) a color-forming para-sulfonamidodiphenylamine dye precursor which is free of sulfonamide groups in an ortho position in relation to the amine —NH— separating the two aryl rings and which is converted upon processing of said element to a sulfonimide dye by cross-oxidation by means of a cross-oxidizing silver halide developing agent;

said process comprising:
(A) developing said photographic element in an alkaline, cross-oxidizing, photographic silver halide developer composition to produce a negative sulfonimide dye image and silver image; then
(B) removing at least part of the silver image from the photographic element.

40. A process of producing a negative sulfonimide dye image as in claim 39 wherein said alkaline, cross-oxidizing developer composition comprises a 1-phenyl-3-pyrazolidone, cross-oxidizing, photographic silver halide developing agent.

41. A process of producing a negative dye image in an imagewise exposed photographic element comprising a support having thereon, in reactive association, in a gelatino binder,
(a) photosensitive silver halide, and
(b) a color-forming para-sulfonamidodiphenylamine dye precursor consisting essentially of 4-N,N-dihexylamino-4'-(2,4,6-triisopropylbenzenesulfonamido)diphenylamine;

said processing comprising:
(A) developing said photographic element in an aqueous, alkaline, cross-oxidizing, photographic silver halide developer solution comprising a cross-oxidizing photographic silver halide developing agent consisting essentially of 4-methyl-4-hydroxymethyl-1-phenyl-3-pyrazolidone; then
(B) removing at least part of the silver image from the photographic element.

42. A process of producing a negative sulfonimide dye image in an imagewise exposed photographic element comprising a support having thereon, in reactive association, in a gelatino binder,
(a) photosensitive silver halide, and
(b) a color-forming para-sulfonamidodiphenylamine dye precursor consisting essentially of 4-n-hexyloxy-3'-methyl-4'-(2,4,6-triisopropylbenzenesulfonamido)diphenylamine;
said process comprising:
(A) developing said photographic element in an aqueous, alkaline, cross-oxidizing photographic silver halide developing solution comprising a cross-oxidizing photographic silver halide developing agent consisting essentially of 4-methyl-4-hydroxymethyl-1-phenyl-3-pyrazolidone; then
(B) removing at least part of the silver image from the photographic element.

43. A process of producing a positive dye image and a positive silver image in an imagewise exposed photographic element comprising a support having thereon, in reactive association, in binder,
(a) direct-positive photographic silver halide, and
(b) a color-forming para-sulfonamidodiphenylamine dye precursor which is free of sulfonamido groups in an ortho position in relation to the amine —NH— separating the two aryl rings which is converted upon processing of said element to a sulfonimide dye by cross-oxidation by means of a cross-oxidizing silver halide developing agent;
said process comprising:
(A) developing said photographic element in an alkaline, cross-oxidizing photographic silver halide developing composition; then
(B) fixing the resulting photographic element to produce a positive sulfonimide dye image and a positive silver image.

44. A process of producing a positive dye image and a positive silver image in an imagewise exposed photographic element comprising a support having thereon, in reactive association, in a gelatino binder,
(a) direct-positive photographic silver halide, and
(b) a color-forming para-sulfonamidodiphenylamine dye precursor consisting essentially of 3-methanesulfonamido-4-methoxy-2'-pivalamido-4'-(2,4,6-triisopropylbenzenesulfonamido)diphenylamine;
said process comprising:
(A) developing said photographic element in an alkaline, cross-oxidizing photographic silver halide developing composition comprising a 3-pyrazolidone silver halide developing agent; then
(B) fixing the resulting photographic element to produce a positive sulfonimide dye image and a positive silver image.

45. In an exposed and processed photographic element comprising a support having thereon a dye image, the improvement comprising:
as said dye image, a dye consisting essentially of a sulfonimide dye represented by the formula:

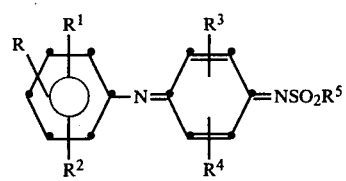

wherein:
R is in the meta or para position and is an electron donating substituent selected from

alkoxy containing 1 to 20 carbon atoms, aryloxy containing 6 to 20 carbon atoms, sulfonamido and carboxamido groups;
$R^1$ is in the ortho or meta position and is hydrogen, alkyl containing 1 to 3 carbon atoms, carbamoyl, alkoxy containing 1 to 3 carbon atoms, sulfonylalkyl containing 1 to 3 carbon atoms, sulfonylaryl containing 6 to 12 carbon atoms, chlorine, bromine, iodine or fluorine;
$R^2$ is hydrogen, alkyl containing 1 to 3 carbon atoms, carbamoyl, alkoxy containing 1 to 3 carbon atoms, sulfonylalkyl containing 1 to 5 carbon atoms, sulfonylaryl containing 6 to 12 carbon atoms, chlorine, bromine, iodine or fluorine;
$R^3$ is hydrogen, alkyl containing 1 to 20 carbon atoms, haloalkyl containing 1 to 3 carbon atoms, alkoxy containing 1 to 20 carbon atoms, an ester containing 1 to 20 carbon atoms, carboxy, carboxamido, chlorine, bromine, iodine, fluorine, carbamoyl, sulfonic acid, sulfamyl, sulfonylalkyl containing 1 to 5 carbon atoms, ureido or a carbocyclic group containing 5 to 12 carbon atoms;
$R^4$ is hydrogen, alkyl containing 1 to 3 carbon atoms, alkoxy containing 1 to 20 carbon atoms, an ester represented by the formula

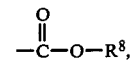

carboxy, carboxamido, chlorine, bromine, iodine, fluorine, carbamoyl, sulfonic acid, sulfamyl, sulfonylalkyl containing 1 to 3 carbon atoms, uredio and a carbocyclic group containing 3 to 6 carbon atoms;
$R^5$ is alkyl containing 1 to 20 carbon atoms or aryl containing 6 to 20 carbon atoms;
$R^6$ is hydrogen, alkyl containing 1 to 20 carbon atoms,

or aryl containing 6 to 20 carbon atoms, or represents, with $R^7$, atoms completing a 5- or 6-member heterocyclic group;
$R^7$ is alkyl containing 1 to 20 carbon atoms, carbamoyl, carboxamido, or represents, with $R^6$, atoms completing a 5- or 6-member heterocyclic group;

$R^8$ is alkyl containing 1 to 4 carbon atoms; and
$R^{64}$ is alkyl containing 1 to 20 carbon atoms.

46. An exposed and processed photographic element as in claim 45 wherein $R^5$ is 2,4,6-triisopropylphenyl.

47. An exposed and processed photographic element as in claim 45 wherein said sulfonimide dye is represented by the formula:

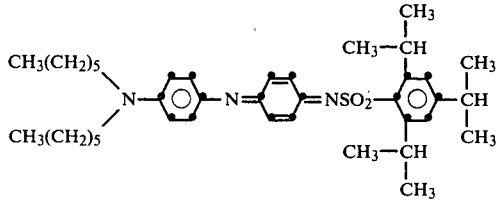

48. An exposed and processed photographic element as in claim 45 wherein said sulfonimide dye is represented by the formula:

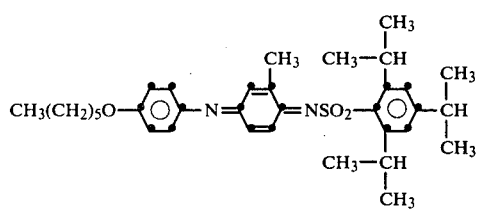

49. An exposed and processed photographic element as in claim 45 wherein said sulfonimide dye is represented by the formula:

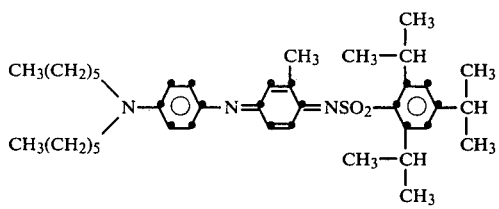

50. An exposed and processed photographic element as in claim 45 wherein said sulfonimide dye is represented by the formula:

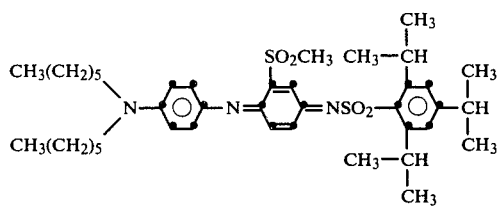

51. An exposed and processed photographic element as in claim 45 wherein said sulfonimide dye is represented by the formula:

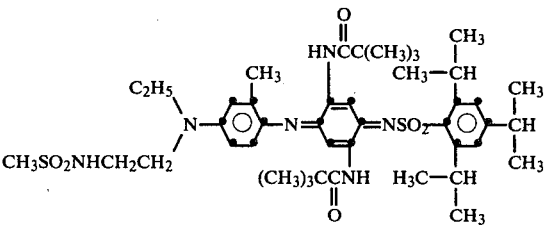

52. An exposed and processed photographic element as in claim 45 wherein said sulfonimide dye is represented by the formula:

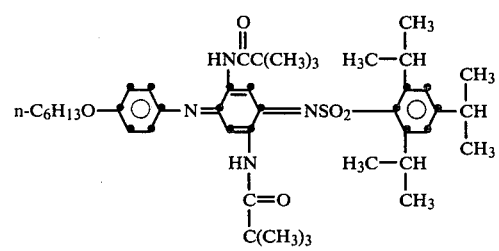

53. An exposed and processed photographic element as in claim 45 also comprising a silver image.

54. An exposed and processed photographic element comprising a support having thereon, in reactive association, in binder, developed silver image enhanced by a sulfonimide dye image wherein said dye image consists essentially of a sulfonimide dye represented by the formula:

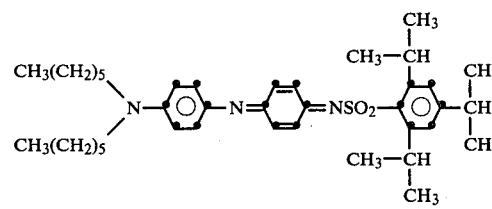

55. An exposed and processed photographic element comprising a support having thereon, in binder, a developed silver image enhanced by a sulfonimide dye image wherein said dye image consists essentially of a sulfonimide dye represented by the formula:

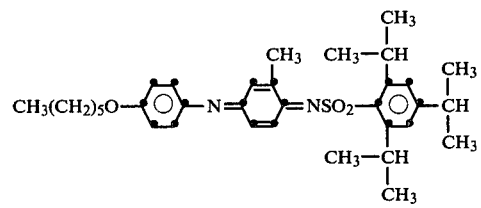

* * * * *